(12) United States Patent
Douglas et al.

(10) Patent No.: US 11,521,292 B2
(45) Date of Patent: Dec. 6, 2022

(54) APPARATUS, METHOD, AND PROGRAM PRODUCT FOR PREVENTING DATA SNIPPING

(71) Applicant: LENOVO (Singapore) PTE. LTD., New Tech Park (SG)

(72) Inventors: David W. Douglas, Cary, NC (US); Adam Jerome Cavenaugh, Cary, NC (US); Kenneth Seethaler, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/215,925

(22) Filed: Mar. 29, 2021

(65) Prior Publication Data

US 2022/0309607 A1 Sep. 29, 2022

(51) Int. Cl.
*G06T 1/20* (2006.01)
*G09G 5/00* (2006.01)
*G06N 20/00* (2019.01)
*G09G 5/38* (2006.01)
*G09G 5/36* (2006.01)

(52) U.S. Cl.
CPC .............. *G06T 1/20* (2013.01); *G06N 20/00* (2019.01); *G09G 5/003* (2013.01); *G09G 5/363* (2013.01); *G09G 5/38* (2013.01)

(58) Field of Classification Search
CPC . G06T 1/20; G09G 5/003; G09G 5/38; G09G 5/363; G06N 20/00
See application file for complete search history.

(56) References Cited

U.S. PATENT DOCUMENTS

| | | | |
|---|---|---|---|
| 2003/0231191 A1* | 12/2003 | Glen | G09G 5/363 348/E9.024 |
| 2014/0354664 A1* | 12/2014 | Brown | G09G 5/363 345/545 |
| 2016/0261815 A1* | 9/2016 | Shiohara | H04N 5/23293 |
| 2021/0275908 A1* | 9/2021 | Amer | A63F 13/25 |

* cited by examiner

*Primary Examiner* — Samantha (Yuehan) Wang
(74) *Attorney, Agent, or Firm* — Kunzler Bean & Adamson

(57) ABSTRACT

Apparatus, methods, and program products for preventing data snipping are disclosed. One apparatus includes a processor and a memory that stores code executable by the processor. The code is executable by the processor to partition an electronic image into a plurality of graphics frames for display on a display device, wherein each separate graphics frame in the plurality of graphics frames includes a different portion of the electronic image, and transmit each separate graphics frame of the plurality of graphics frames to the display device, wherein each separate graphics frame in the plurality of graphics frames is separately transmitted to the display device for display thereon within each display cycle. Methods and computer program products that perform the operations and/or functions of the apparatus are also disclosed.

20 Claims, 23 Drawing Sheets

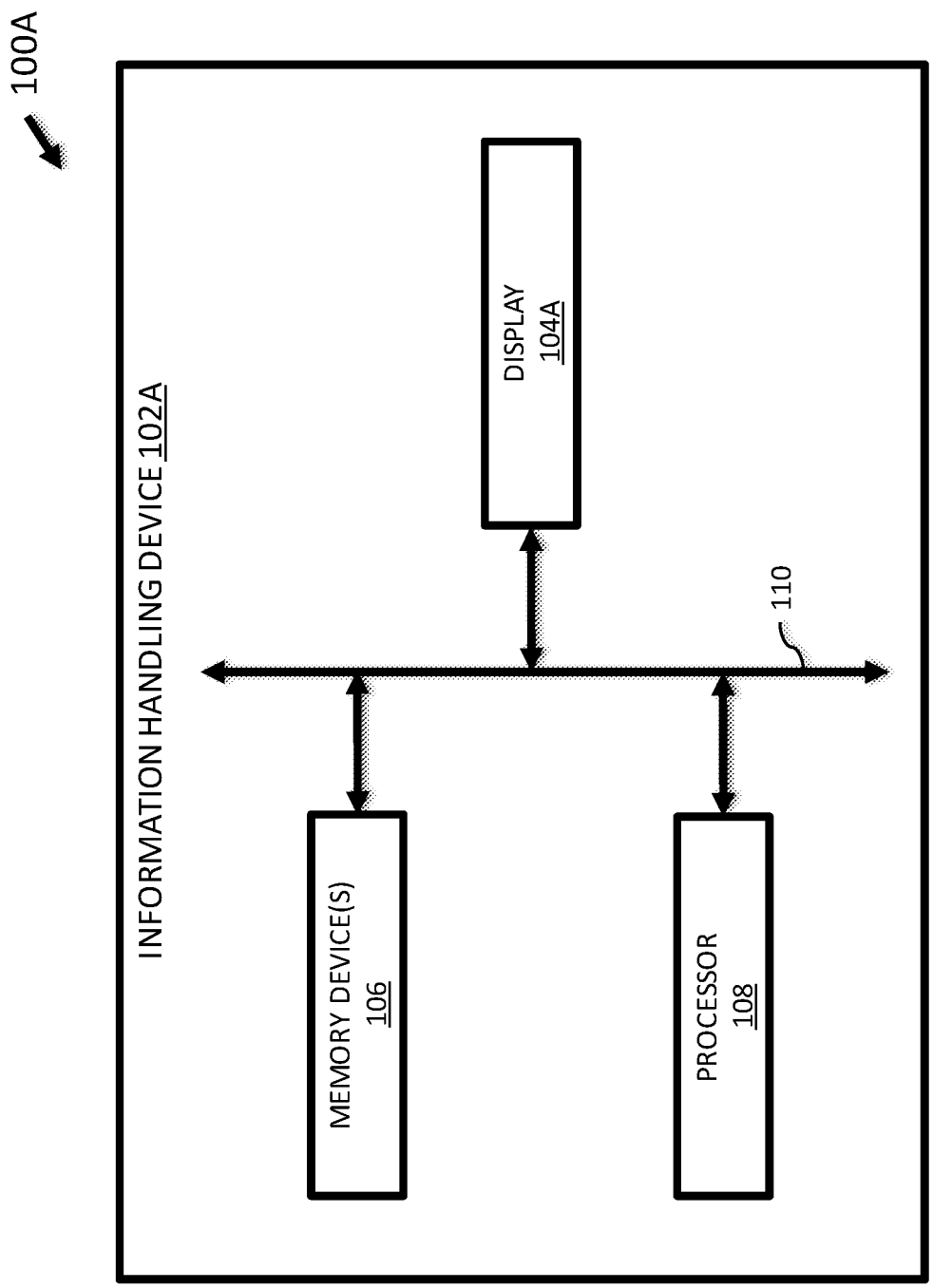

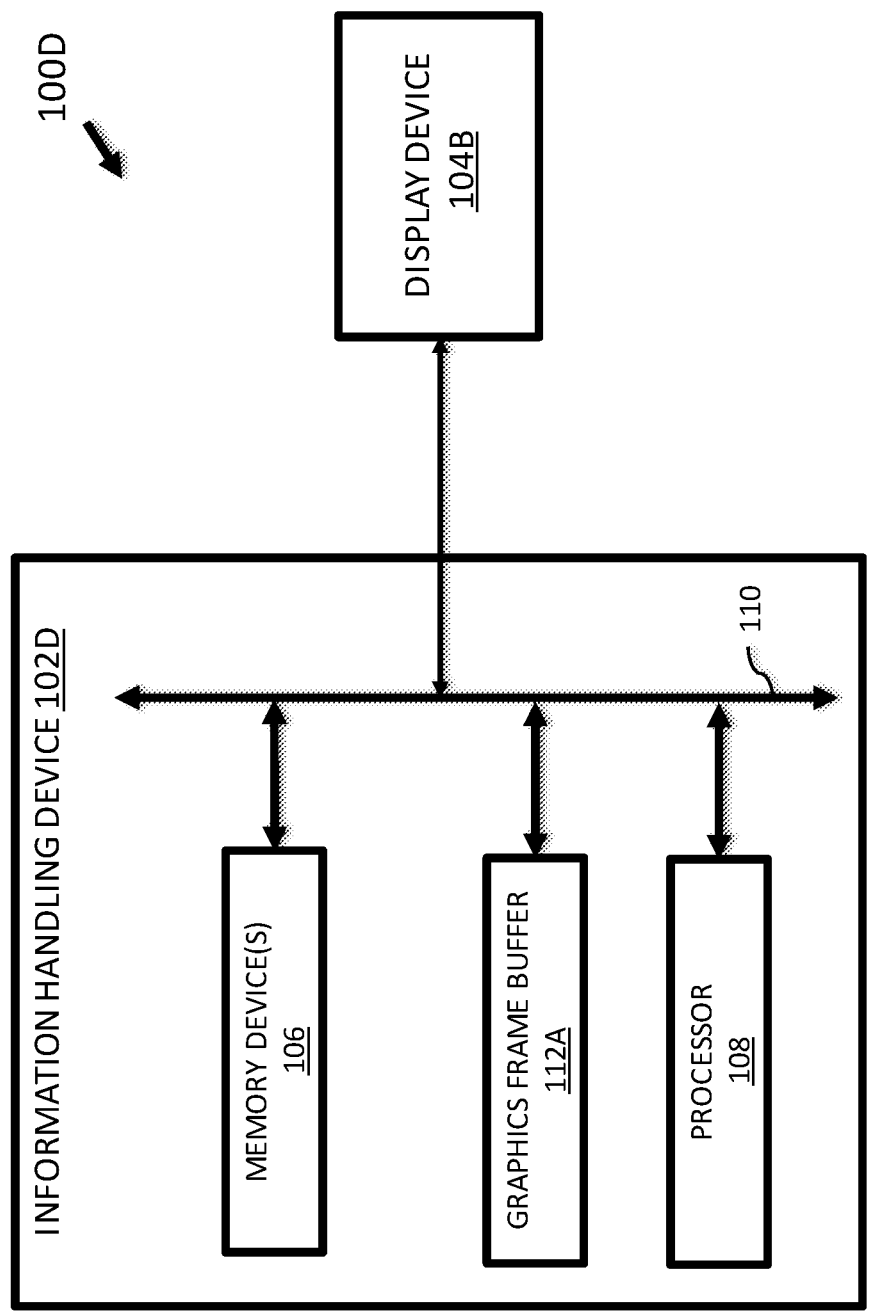

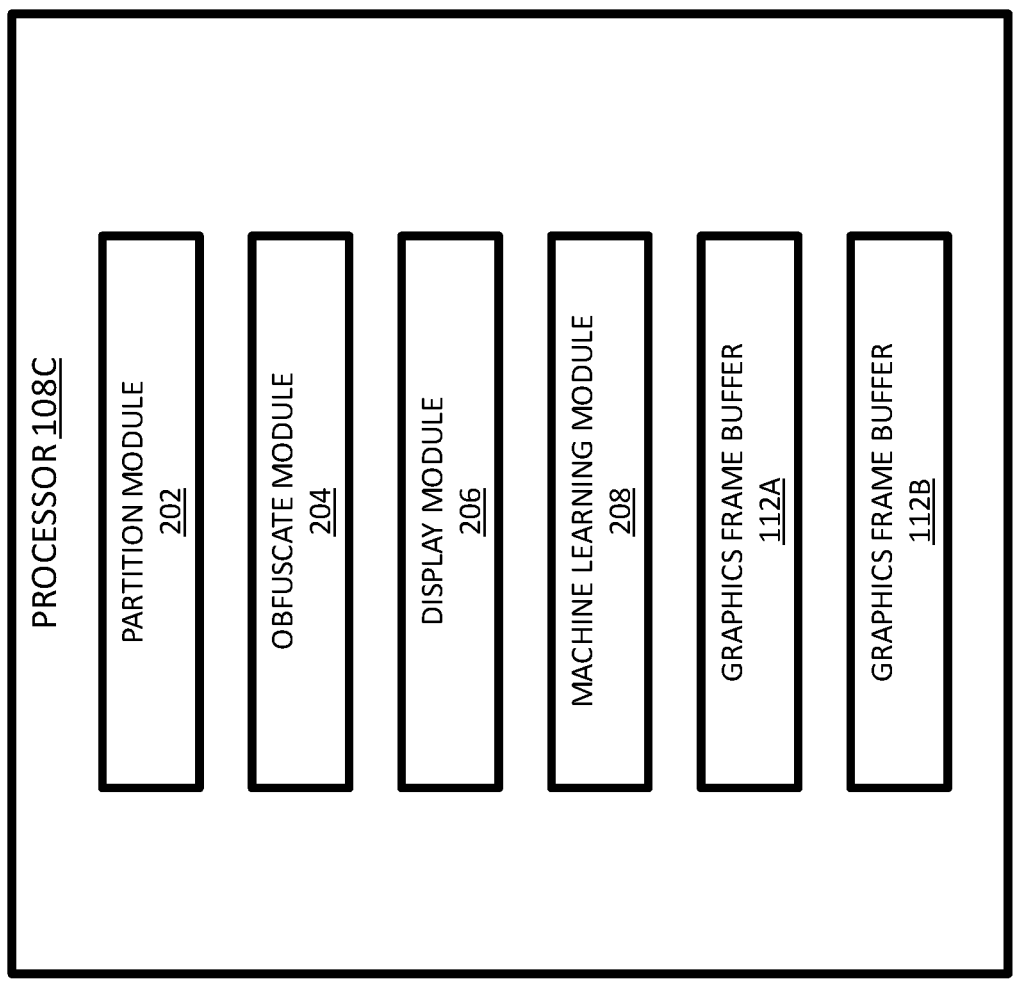

GRAPHICS FRAME BUFFER 112A1

| F0 | F1 | F2 | F3 | F4 | F5 | F6 | F7 | F8 | F9 |
| F10 | F11 | F12 | F13 | F14 | F15 | F16 | F17 | F18 | F19 |
| F20 | F21 | F22 | F23 | F24 | F25 | F26 | F27 | F28 | F29 |

FIG. 4A

| GRAPHICS FRAME BUFFER 112A2 | | | | | | | | | |
|---|---|---|---|---|---|---|---|---|---|
| F0 | F1 | F2 | F3 | F4 | F5 | F6 | F7 | F8 | F9 |
| F10 | F11 | F12 | F13 | F14 | F15 | F16 | F17 | F18 | F19 |
| F20 | F21 | F22 | F23 | F24 | F25 | F26 | F27 | F28 | F29 |
| F30 | F31 | F32 | F33 | F34 | F35 | F36 | F37 | F38 | F39 |
| F40 | F41 | F42 | F43 | F44 | F45 | F46 | F47 | F48 | F49 |
| F50 | F51 | F52 | F53 | F54 | F55 | F56 | F57 | F58 | F59 |

FIG. 4B

| GRAPHICS FRAME BUFFER 112A3 | | | | | | | | | |
|---|---|---|---|---|---|---|---|---|---|
| F0 | F1 | F2 | F3 | F4 | F5 | F6 | F7 | F8 | F9 |
| F10 | F11 | F12 | F13 | F14 | F15 | F16 | F17 | F18 | F19 |
| F20 | F21 | F22 | F23 | F24 | F25 | F26 | F27 | F28 | F29 |
| F30 | F31 | F32 | F33 | F34 | F35 | F36 | F37 | F38 | F39 |
| F40 | F41 | F42 | F43 | F44 | F45 | F46 | F47 | F48 | F49 |
| F50 | F51 | F52 | F53 | F54 | F55 | F56 | F57 | F58 | F59 |

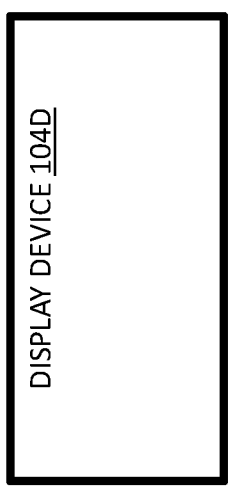
FIG. 7A
FIG. 7B

APPARATUS, METHOD, AND PROGRAM PRODUCT FOR PREVENTING DATA SNIPPING

FIELD

The subject matter disclosed herein relates to computing displays and more particularly relates to preventing data snipping by remote users.

DESCRIPTION OF THE RELATED ART

Information handling devices, such as desktop computers, laptop computers, tablet computers, smart phones, and the like computing devices are ubiquitous in society. These information handling devices generally include and/or are connected to one or more display devices. Ensuring that data is secure, private, and/or uncopiable when the data is being displayed on a display device may be desirable in at least some situations, at certain times, and/or in particular environments.

For example, various tools may enable and/or allow a remote user to copy and/or take a screen shot of data that is being displayed on the remote user's display device. This capability is often referred to as, "snipping" or "data snipping." In some situations, it may be desirable to prevent remote users from snipping data, taking a screenshot of data being shared by a host computing device to a remote user's computing device, and/or copying data that is being displayed on the remote user's display device.

BRIEF SUMMARY

An apparatus for preventing data snipping is disclosed. A method and computer program product also perform the functions of the apparatus. In one embodiment, the apparatus includes a processor of an information handling device and a memory configured to store code. The code, in various embodiments, is executable by the processor to partition an electronic image into a plurality of graphics frames for display on a display device, wherein each separate graphics frame in the plurality of graphics frames includes a different portion of the electronic image, and transmit each separate graphics frame of the plurality of graphics frames to the display device, wherein each separate graphics frame in the plurality of graphics frames is separately transmitted to the display device for display thereon within each display cycle.

A method, in one embodiment, includes partitioning, by a processor, an electronic image into a plurality of graphics frames for display on a display device, wherein each separate graphics frame in the plurality of graphics frames includes a different portion of the electronic image. In certain embodiments, the method further includes transmitting each separate graphics frame of the plurality of graphics frames to the display device, wherein each separate graphics frame in the plurality of graphics frames is separately transmitted to the display device for display thereon within each display cycle.

In one embodiment, a program product includes a computer-readable storage medium that stores code executable by a processor. The executable code, in certain embodiments, includes code to perform partitioning an electronic image into a plurality of graphics frames for display on a display device, wherein each separate graphics frame in the plurality of graphics frames includes a different portion of the electronic image, and transmitting each separate graphics frame of the plurality of graphics frames to the display device, wherein each separate graphics frame in the plurality of graphics frames is separately transmitted to the display device for display thereon within each display cycle.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIGS. 1A through 1H are schematic block diagrams of various embodiments of a computing system (and/or computing network) that can prevent data snipping;

FIGS. 3A through 3C are schematic block diagrams of various embodiments of a processor included in the computing systems (and/or computing networks) of FIGS. 1A through 1H;

FIGS. 4A through 4C are schematic block diagrams of various embodiments of a graphics frame buffer included in the computing systems (and/or computing networks) of FIGS. 1A through 1H;

FIGS. 5A and 5B are schematic block diagrams of various embodiments of another graphics frame buffer included in the computing systems (and/or computing networks) of FIGS. 1E through 1H;

FIGS. 7A and 7B are schematic block diagrams of other non-limiting examples of operations performed by the various embodiments of the computing systems (and/or computing networks) of FIGS. 1E through 1H;

DETAILED DESCRIPTION

Figure 1B:
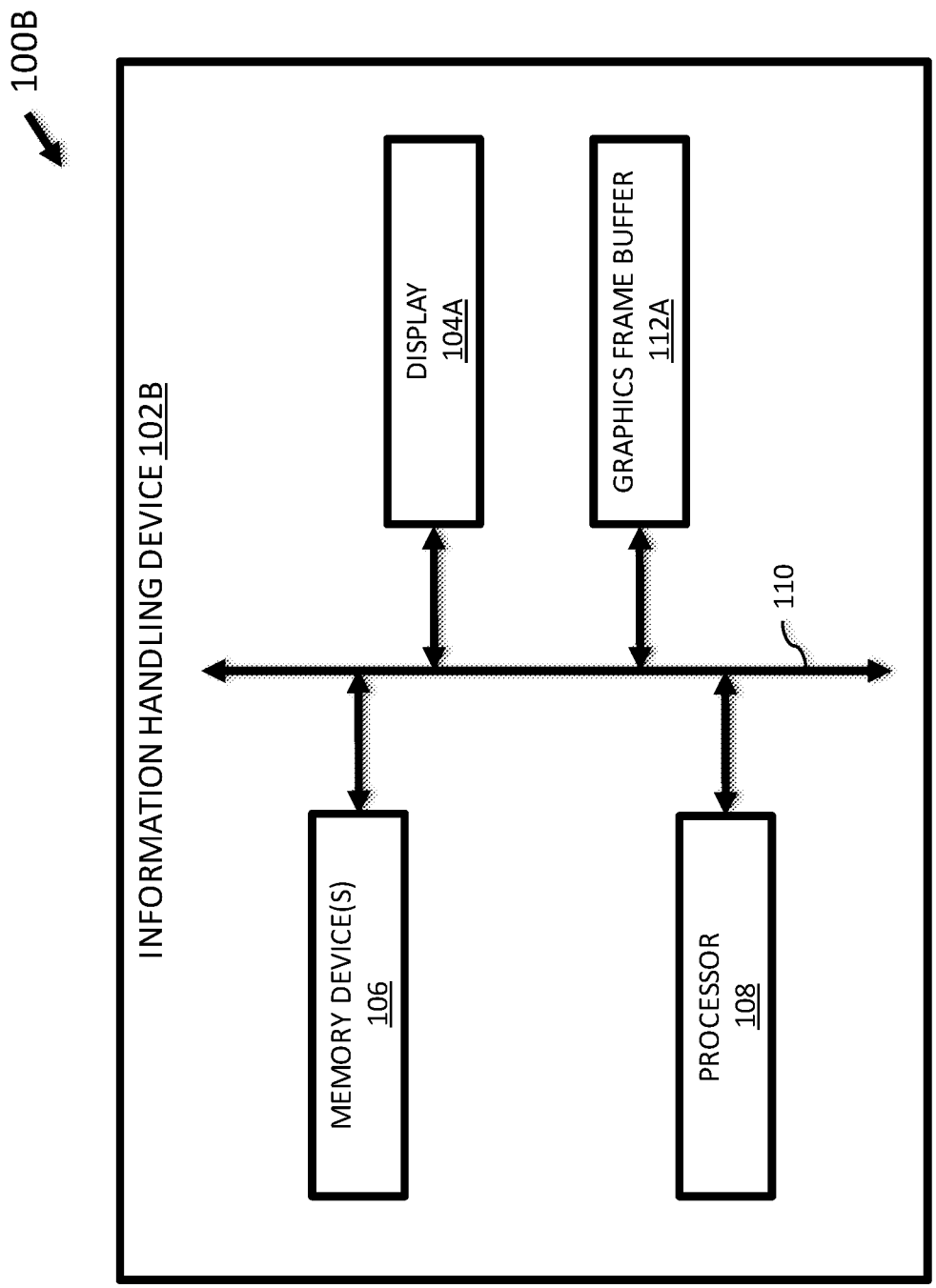

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a circuit, module, or system. Furthermore, embodiments may take the form of a program product embodied in one or more computer-readable storage devices storing machine readable code, computer-readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together and may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer-readable storage devices. Where a module or portions of a module are implemented in software, the software portions are stored on one or more computer-readable storage devices.

Any combination of one or more computer-readable media may be utilized. The computer-readable medium/media may include one or more computer-readable storage media. The computer-readable storage medium/media may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (e.g., a non-exhaustive and/or non-limiting list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the C programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to one embodiment, an embodiment, or similar language means that a particular feature, structure, or characteristic described in connection with the embodiment is included in at least one embodiment. Thus, appearances of the phrases in one embodiment, in an embodiment, and similar language throughout this specification may, but do not necessarily, all refer to the same embodiment, but mean one or more but not all embodiments unless expressly specified otherwise. The terms including, comprising, having, and variations thereof mean including but not limited to, unless expressly specified otherwise. An enumerated listing of items does not imply that any or all of the items are mutually exclusive, unless expressly specified otherwise. The terms, "a," "an," and "the," also refer to one or more unless expressly specified otherwise.

In addition, as used herein, the term, "set," can mean one or more, unless expressly specified otherwise. The term, "sets," can mean multiples of or a plurality of one or mores, ones or more, and/or ones or mores consistent with set theory, unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatus, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1A is a schematic block diagram of one embodiment of a computing system 100A (and/or computing network) that can prevent data and/or data content from being snipped and/or electronically copied by a user (e.g., a remote user). At least in the illustrated embodiment, the computing system 100A includes, among other components, an information handling device 102A (e.g., a laptop computer, a personal digital assistant (PDA), a tablet computer, a smart phone, a cellular telephone, a smart television (e.g., televisions connected to the Internet), a wearable, an Internet of Things (IoT) device, a game console, a vehicle on-board computer, a streaming device, a smart device, and a digital assistant, etc., among other information handling devices that include an internal display device that are possible and contemplated herein). The information handling device 102A includes, among other components, a display device 104A, a set of memory devices 106, and a processor 108 coupled to and/or in communication with one another via a bus 110 (e.g., a wired and/or wireless bus).

FIG. 1B is a schematic block diagram of another embodiment of a computing system 100B (and/or computing network) that can prevent data and/or data content from being snipped and/or electronically copied by a user (e.g., a remote user). At least in the illustrated embodiment, the computing system 100B includes, among other components, an information handling device 102B (e.g., a laptop computer, a PDA, a tablet computer, a smart phone, a cellular telephone, a smart television, a wearable, an IoT device, a game console, a vehicle on-board computer, a streaming device, a smart device, and a digital assistant, etc., among other information handling devices that include an internal display device that are possible and contemplated herein). The information handling device includes, among other components, a display device 104A, a set of memory devices 106, a processor 108, and a graphics frame buffer 112A coupled to and/or in communication with one another via a bus 110.

Figure 1C:
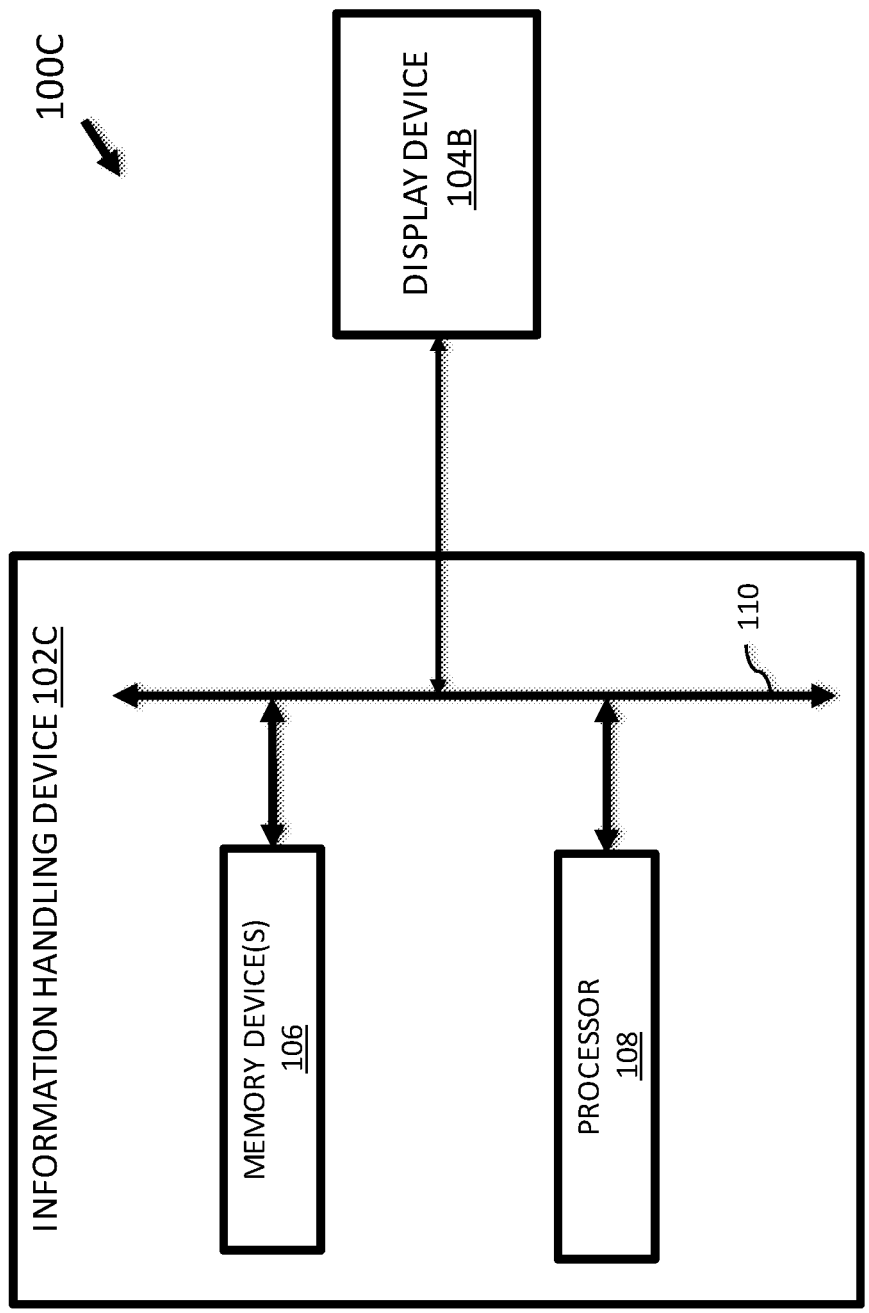

FIG. 1C is a schematic block diagram of yet another embodiment of a computing system 100C (and/or computing network) that can prevent data and/or data content from being snipped and/or electronically copied by a user (e.g., a remote user). At least in the illustrated embodiment, the computing system 100C includes, among other components, an information handling device 102C (e.g., a desktop computer, a set-top box, a game console, a vehicle on-board computer, and a streaming device, etc., among other information handling devices that utilize an external display device that are possible and contemplated herein) coupled to and/or in communication with a display device 104B (e.g., an external display device). The information handling device 102C includes, among other components, a set of memory devices 106 and a processor 108 coupled to and/or in communication with one another and the display device 104B via a bus 110.

FIG. 1D is a schematic block diagram of still another embodiment of a computing system 100D (and/or computing network) that can prevent data and/or data content from being snipped and/or electronically copied by a user (e.g., a remote user). At least in the illustrated embodiment, the computing system 100D includes, among other components, an information handling device 102D (e.g., a desktop computer, a set-top box, a game console, a vehicle on-board computer, and a streaming device, etc., among other information handling devices that utilize an external display device that are possible and contemplated herein) coupled to and/or in communication with a display device 104B (e.g., an external display device). The information handling device 102D includes, among other components, a set of memory devices 106, a processor 108, and a graphics frame buffer 112A coupled to and/or in communication with one another and the display device 104B via a bus 110.

Figure 1E:
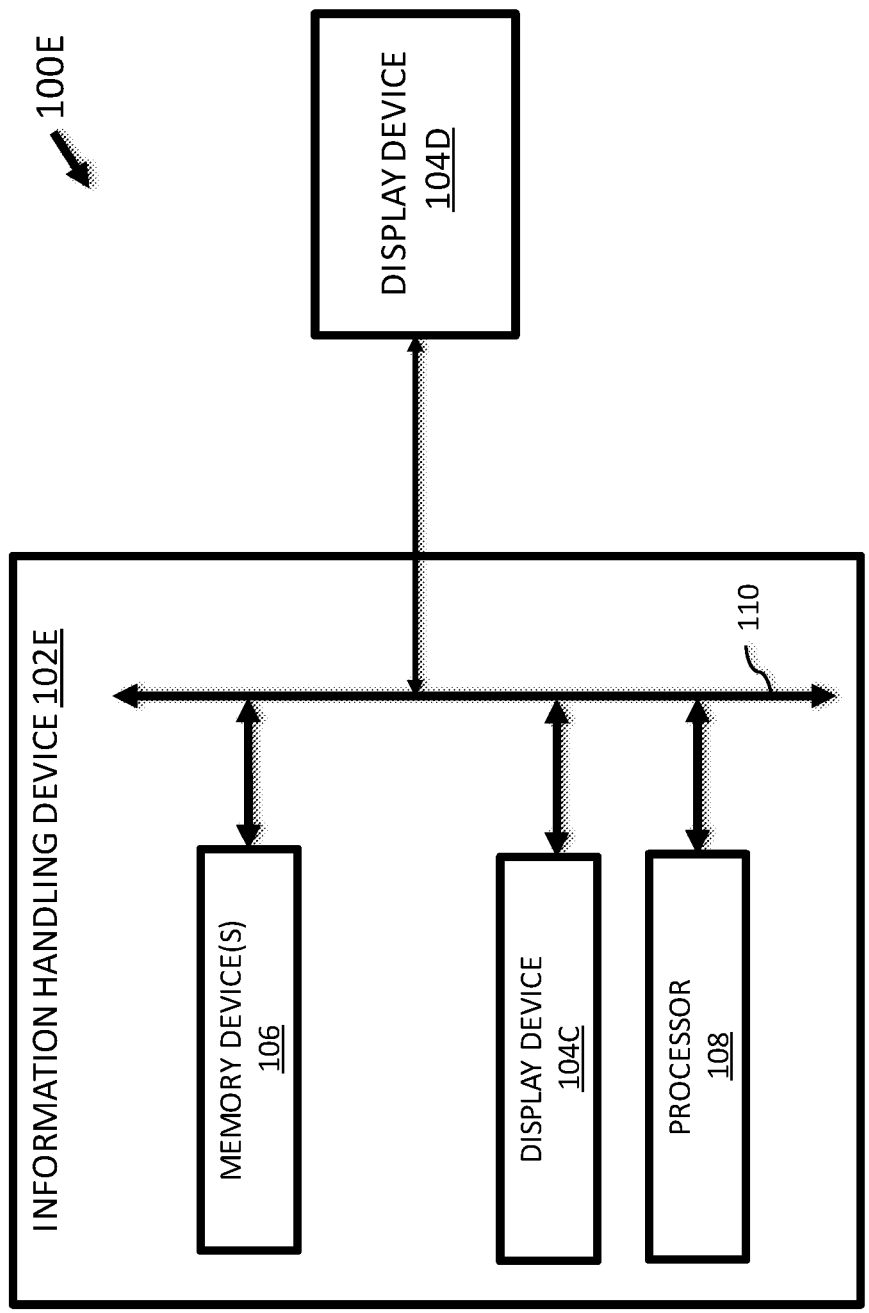

FIG. 1E is a schematic block diagram of an embodiment of a computing system 100E (and/or computing network) that can prevent data and/or data content from being snipped and/or electronically copied by a user (e.g., a remote user). At least in the illustrated embodiment, the computing system 100E includes, among other components, an information handling device 102E (e.g., a laptop computer, a PDA, a tablet computer, a smart phone, a cellular telephone, a smart television, a wearable, an IoT device, a game console, a vehicle on-board computer, a streaming device, a smart device, and a digital assistant, etc., among other information handling devices that include an internal display device that are possible and contemplated herein) coupled to and/or in communication with a display device 104D (e.g., a head mounted display (HMD) device, etc.). The information handling device 102E includes, among other components, a display device 104C, a set of memory devices 106 and a processor 108 coupled to and/or in communication with one another and the display device 104D via a bus 110.

Figure 1F:
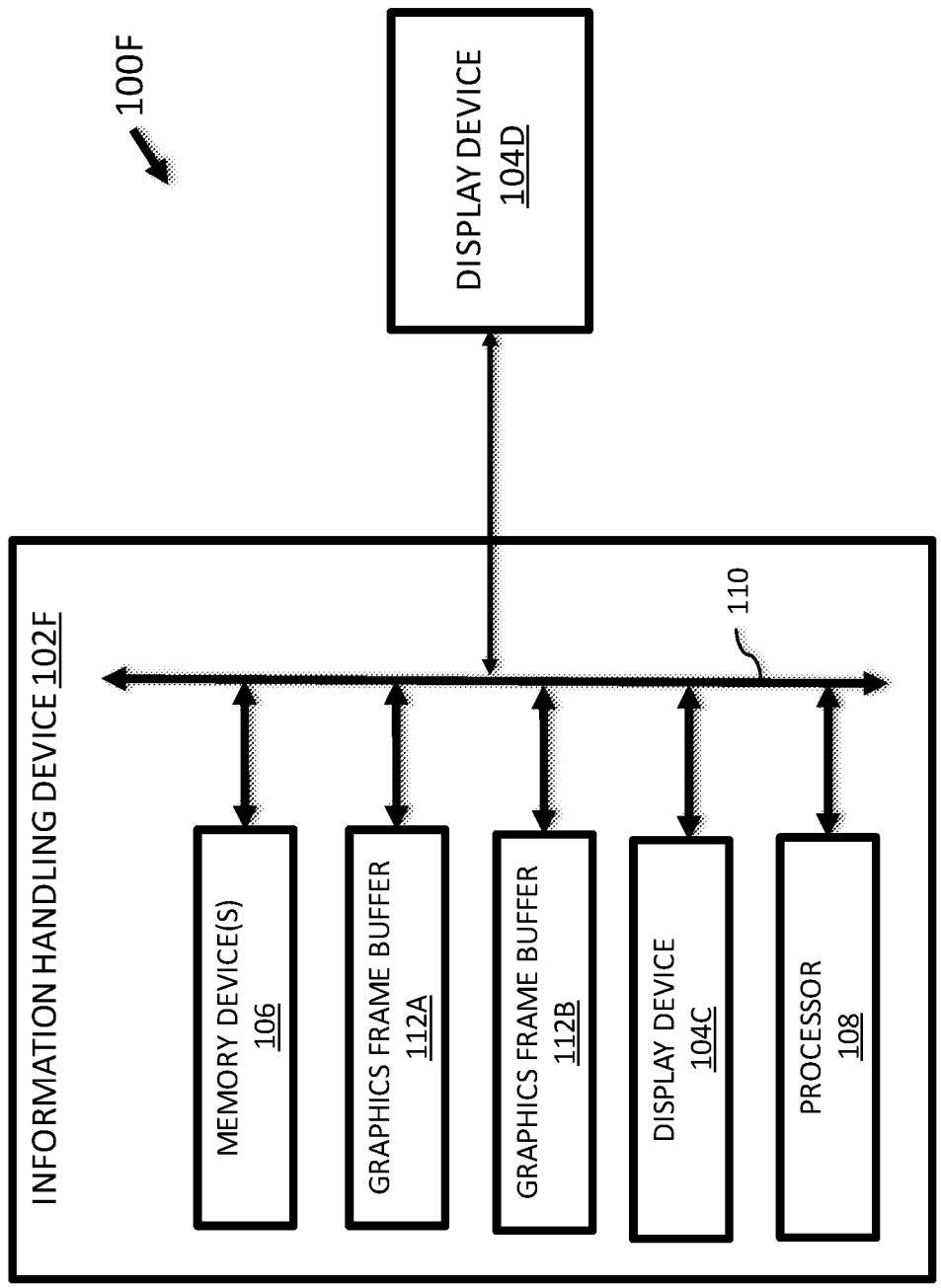

FIG. 1F is a schematic block diagram of an embodiment of a computing system 100F (and/or computing network) that can prevent data and/or data content from being snipped and/or electronically copied by a user (e.g., a remote user). At least in the illustrated embodiment, the computing system 100F includes, among other components, an information handling device 102F (e.g., a laptop computer, a PDA, a tablet computer, a smart phone, a cellular telephone, a smart television, a wearable, an IoT device, a game console, a vehicle on-board computer, a streaming device, a smart device, and a digital assistant, etc., among other information handling devices that include an internal display device that are possible and contemplated herein) coupled to and/or in communication with a display device 104D (e.g., an HMD device, etc.). The information handling device 102F includes, among other components, a display device 104C, a set of memory devices 106, a processor 108, a graphics frame buffer 112A, and a graphics frame buffer 112B coupled to and/or in communication with one another and the display device 104D via a bus 110.

Figure 1G:
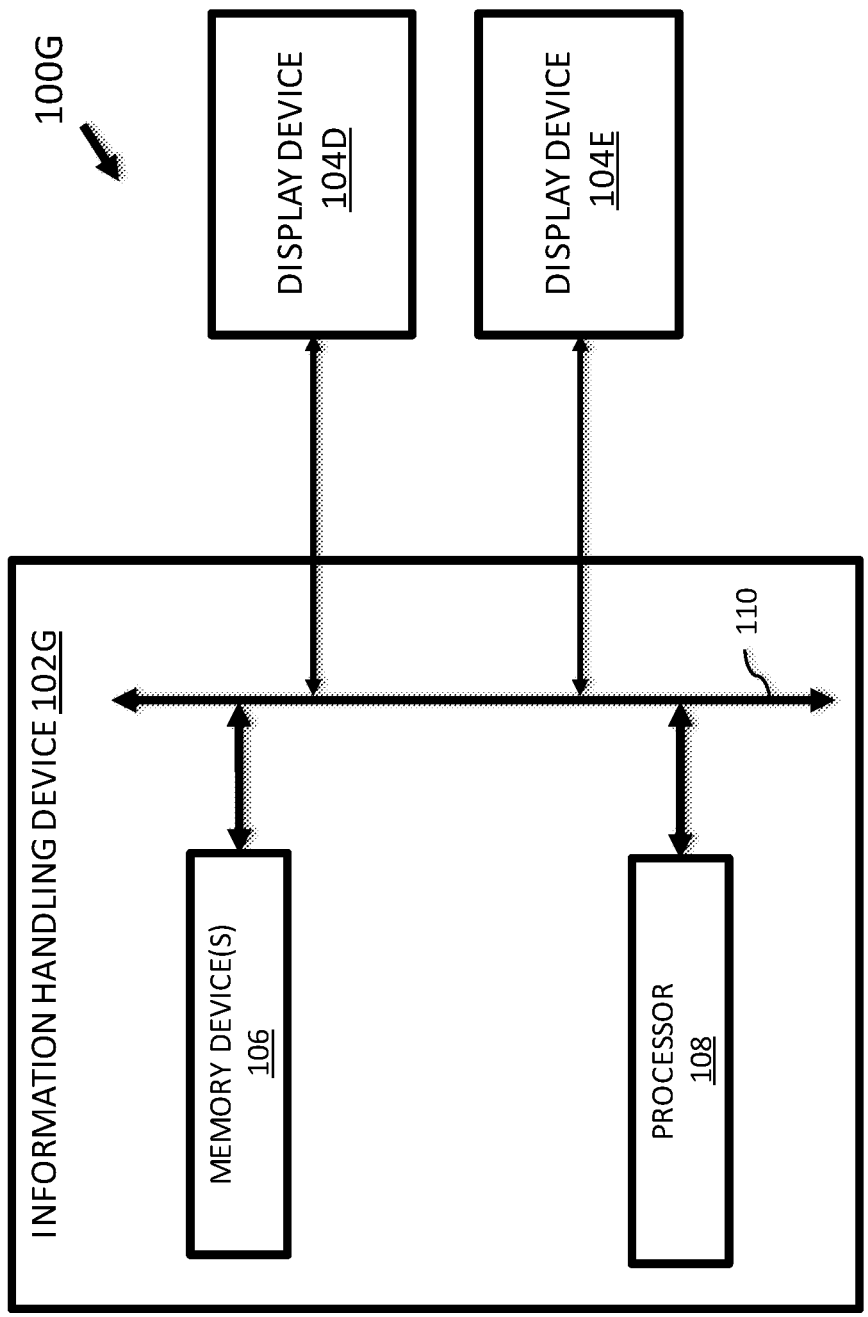

FIG. 1G is a schematic block diagram of another embodiment of a computing system 100G (and/or computing network) that can prevent data and/or data content from being snipped and/or electronically copied by a user (e.g., a remote user). At least in the illustrated embodiment, the computing system 100G includes, among other components, an information handling device 102G (e.g., a desktop computer, a set-top box, a game console, a vehicle on-board computer, and a streaming device, etc., among other information handling devices that utilize an external display device that are possible and contemplated herein) coupled to and/or in communication with a display device 104D (e.g., an HMD device, etc.) and a display device 104E (e.g., an external display device). The information handling device 102G includes, among other components, a set of memory devices 106 and a processor 108 coupled to and/or in communication with one another, the display device 104D, and the display device 104E via a bus 110.

Figure 1H:
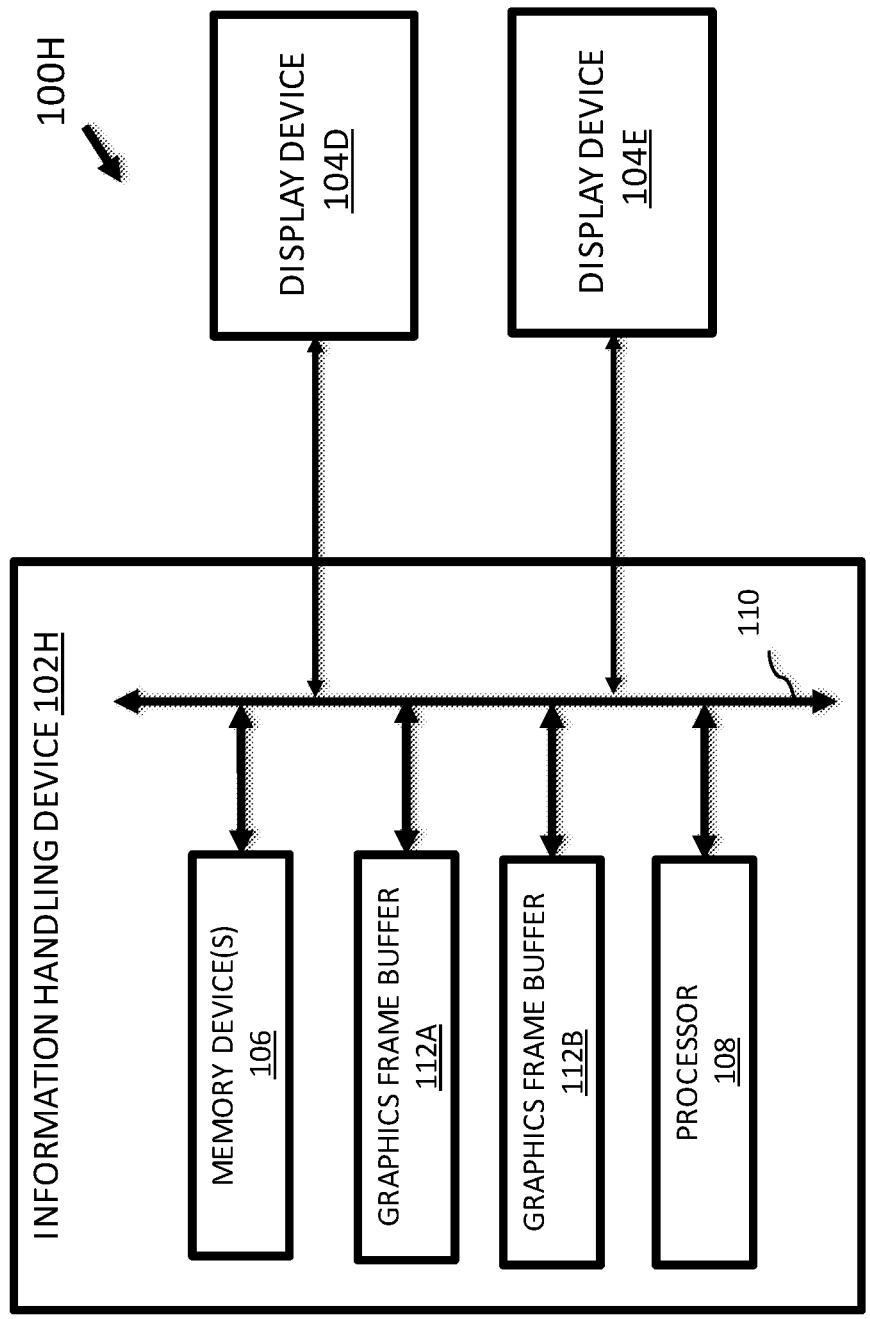

FIG. 1H is a schematic block diagram of yet another embodiment of a computing system 100H (and/or computing network) that can prevent data and/or data content from being snipped and/or electronically copied by a user (e.g., a remote user). At least in the illustrated embodiment, the computing system 100H includes, among other components, an information handling device 102H (e.g., a desktop computer, a set-top box, a game console, a vehicle on-board computer, and a streaming device, etc., among other information handling devices that utilize an external display device that are possible and contemplated herein) coupled to and/or in communication with a display device 104D (e.g., an HMD device, etc.) and a display device 104E (e.g., an external display device). The information handling device 102H includes, among other components, a set of memory devices 106, a processor 108, a graphics frame buffer 112A, and a graphics frame buffer 112B coupled to and/or in communication with one another, the display device 104D, and the display device 104E via a bus 110.

With reference to FIGS. 1A and 1B, a display device 104A may include any suitable hardware and/or software that can display digital information (e.g., digital data) thereon. In various embodiments, the display device 104A includes an internal display device or other similar device that can display data thereon that forms a portion of an information handling device (e.g., information handling devices 102A and 102B). In some embodiments, the display device 104A includes a touch screen that can receive one or more inputs from a user via the user's fingers and/or a stylus, etc.

The display device 104A, in various embodiments, is configured to receive commands and/or instructions from a processor (e.g., processor 108A or processor 108B) for displaying data thereon. In some embodiments, the commands and/or instructions from the processor 108A or 108B enable and/or allow the display device 104A to prevent or substantially prevent the data and/or data content being displayed/shown on the display device 104A from being snipped and/or electronically copied by the user (e.g., a remote user), as discussed in greater detail elsewhere herein.

Referring to FIGS. 1C and 1D, a display device 104B may include any suitable hardware and/or software that can display digital information (e.g., digital data) thereon. In various embodiments, the display device 104B includes an external display device, monitor, and/or other similar device that can display data thereon that is separate from an information handling device (e.g., information handling devices 102C and 102D). In some embodiments, the display device 104B includes a stand-alone display device.

The display device 104B, in various embodiments, is configured to receive commands and/or instructions from a processor (e.g., processor 108C or processor 108D) for displaying data thereon. In some embodiments, the commands and/or instructions from the processor 108C or 108D enable and/or allow the display device 104B to prevent or substantially prevent the data and/or data content being displayed/shown on the display device 104B from being snipped and/or electronically copied by the user (e.g., a remote user), as discussed in greater detail elsewhere herein.

With reference to FIGS. 1E and 1F, a display device 104C may include any suitable hardware and/or software that can display digital information (e.g., digital data) thereon. In various embodiments, the display device 104C includes an internal display device or other similar device that can display data thereon that forms a portion of an information handling device (e.g., information handling devices 102E and 102F). In some embodiments, the display device 104C includes a touch screen that can receive one or more inputs from a user via the user's fingers and/or a stylus, etc.

The display device 104C, in various embodiments, is configured to receive commands and/or instructions from a processor (e.g., processor 108E or processor 108F) for displaying data thereon. In some embodiments, the commands and/or instructions from the processor 108E or 108F enable and/or allow the display device 104C to prevent or substantially prevent the data and/or data content being displayed/shown on the display device 104C from being snipped and/or electronically copied by the user (e.g., a remote user), as discussed in greater detail elsewhere herein. In additional or alternative embodiments, the commands and/or instructions from the processor 108E or 108F enable and/or allow the display device 104C to prevent or substantially prevent the data and/or data content being displayed/shown on the display device 104C from being viewed by an unauthorized third-party (e.g., via shoulder surfing), as discussed in greater detail elsewhere herein.

Referring to FIGS. 1G and 1H, a display device 104E may include any suitable hardware and/or software that can display digital information (e.g., digital data) thereon. In various embodiments, the display device 104E includes an external display device, monitor, and/or other similar device that can display data thereon that is separate from an information handling device (e.g., information handling devices 102G and 102H). In some embodiments, the display device 104E includes a stand-alone display device. The display device 104E, in various embodiments, is configured to receive commands and/or instructions from a processor (e.g., processor 108G or processor 108H) for displaying data thereon. In some embodiments, the commands and/or instructions from the processor 108G or 108H enable and/or allow the display device 104E to prevent or substantially prevent the data and/or data content being displayed/shown on the display device 104E from being snipped and/or electronically copied by the user (e.g., a remote user), as discussed in greater detail elsewhere herein. In additional or alternative embodiments, the commands and/or instructions from the processor 108G or 108H enable and/or allow the display device 104E to prevent or substantially prevent the data and/or data content being displayed/shown on the display device 104E from being viewed by an unauthorized third-party (e.g., via shoulder surfing), as discussed in greater detail elsewhere herein.

With reference to FIGS. 1E through 1H, a display device 104D may include any suitable hardware and/or software that can display digital information (e.g., digital data) thereon. In various embodiments, the display device 104D includes an HMD device, examples of which may include, but are not limited to smart glasses, smart goggles, virtual reality (VR) glasses, VR goggles, augmented reality (AR) glasses, AR goggles, etc., among other types of personal and/or private display devices and/or HMD devices that are possible and contemplated herein. By design, the display device 104D prevents or substantially prevents the data and/or data content being displayed/shown on the display device 104D (and on the display device 104C) from being viewed by an unauthorized third-party.

The display device 104D, in various embodiments, is configured to receive commands and/or instructions from a processor (e.g., processor 108E, processor 108F, processor 108G, or processor 108H) for displaying data thereon. In some embodiments, the commands and/or instructions from the processor 108E, processor 108F, processor 108G, or processor 108H enable and/or allow the display device 104D to prevent or substantially prevent the data and/or data content being displayed/shown on the display device 104D from being snipped and/or electronically copied by the user (e.g., a remote user), as discussed in greater detail elsewhere herein.

In various embodiments, the display device 104D, working in conjunction with the display device 104C or 104E, can prevent or substantially data snipping and shoulder surfing. In other words, the display device 104D and the display devices 104C or 104E can create privacy and/or security in data being displayed on remote devices.

A set of memory devices 106 may include any suitable quantity of memory devices 106. Further, a memory device 106 may include any suitable type of device and/or system that is known or developed in the future that can store computer-useable and/or computer-readable code. In various embodiments, a memory device 106 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

A memory device 106, in some embodiments, includes volatile computer storage media. For example, a memory device 106 may include random access memory (RAM), including dynamic RAM (DRAM), synchronous dynamic RAM (SDRAM), and/or static RAM (SRAM). In other embodiments, a memory device 106 includes non-volatile computer storage media. For example, a memory device 106 may include a hard disk drive, a flash memory, and/or any other suitable non-volatile computer storage device that is known or developed in the future. In various embodiments, a memory device 106 includes both volatile and non-volatile computer storage media. In additional embodiments, a memory device 106 also stores program code and/or related data, such as an operating system (OS) and/or other controller algorithms operating on an information handling device 102.

Figure 2A:
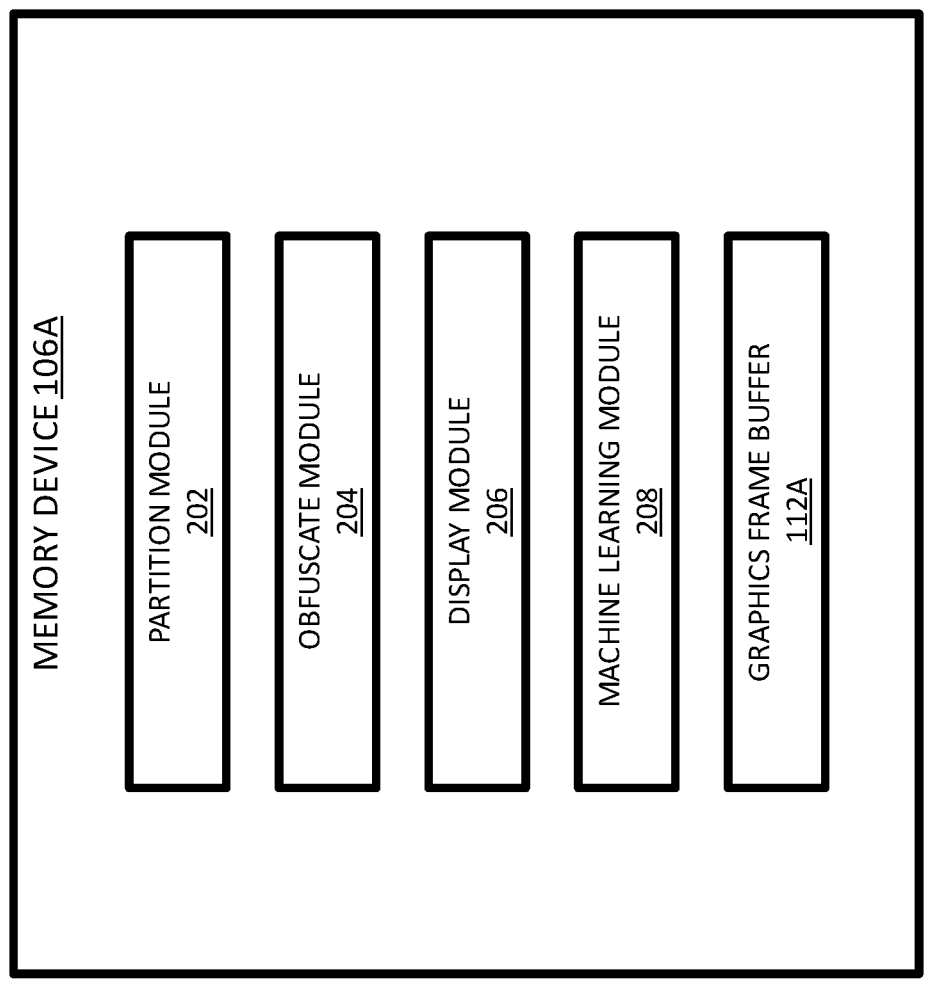
FIGS. 2A through 2C are schematic block diagrams of various embodiments of a memory device included in the computing systems (and/or computing networks) of FIGS. 1A through 1H.

With reference now to FIG. 2A, FIG. 2A is a schematic block diagram of an embodiment of a memory device 106A. At least in the illustrated embodiment, the memory device 106A includes, among other components, a partition module 202, an obfuscate module 204, a display module 206, a machine learning module 208, and a graphics frame buffer 112A.

A partition module 202 may include any suitable hardware and/or software that can partition a portion of the data or the entirety of the data being displayed on a display device (e.g., display devices 104A, 104B, 104C, 104D, and 104E, which are also simply referred to herein individually, in groups, and/or collectively as, display device(s) 104). In various embodiments, the partition module 202 is configured to partition or separate the portion of data or the entirety of the data being displayed into a plurality of graphics frames.

In some embodiments, each graphics frame of the plurality of graphics frames includes a sub-portion of the portion of data or a portion of the entirety of the data. In certain embodiments, each graphics frame of the plurality of graphics frames only includes the sub-portion of the portion of data or the portion of the entirety of the data.

The partition module 202, in various embodiments, is configured to partition the portion of data or the entirety of the data into a predetermined quantity of different graphics frames, which can include any suitable quantity of graphics frames. Here, each graphics frame includes a different portion of the portion of data or the entirety of the data and the cumulation of all of the graphics frames produces the portion of data or the entirety of the data.

In some embodiments, the predetermined quantity of graphics frames is based on the frame rate at which the portion of data or the entirety of the data is going to be displayed on a display device 104. Here, the partition module 202 is configured to partition the portion of data or the entire data to be displayed on the display device 104 into a quantity of graphics frames that is equal to or substantially equal to the quantity of graphics frames included in one display cycle of the frame rate and/or frequency rate. In other words, the quantity of partitioned graphics frames equals the quantity of graphics frames included in one and/or each display cycle of the display device 104.

In various embodiments, the partition module 202 is configured to partition the portion of data or the entirety of the data for display on a display device 104 into a quantity of graphics frames in the range of about thirty (30) graphics frames to about five hundred (500) graphics frames, among other suitable quantities that are less than 30 graphics frames and/or greater than 500 graphics frames that are possible and contemplated herein. In certain embodiments, the partition module 202 is configured to partition the portion of data or the entirety of the data for display on a display device 104 into 30 graphics frames, sixty (60) graphics frames, one hundred twenty (120) graphics frames, two hundred forty (240) graphics frames, three hundred (300) graphics frames, three hundred sixty (360) graphics frames, or four hundred eighty (480) graphics frames, among other suitable quantities that are possible and contemplated herein.

The predetermined quantity of graphics frames, in various embodiments, is based on the frame rate and/or frequency rate at which the portion of data or the entirety of the data is being displayed and/or is scheduled for display on a display device 104. For example, when the portion of data or the entire data is being displayed and/or is scheduled for display on a display device 104 at a frame rate of 30 frames per second (FPS) or a frequency rate of 30 hertz (Hz), the partition module 202 is configured to partition the portion of data or the entirety of the data into 30 different and/or separate graphics frames. That is, in coordination with the portion of data or the entirety of the data being displayed on a display device 104 at 30 FPS or 30 Hz, the partition module 202 will correspondingly partition the portion of data or the entirety of the data into 30 graphics frames. In other non-limiting examples, the partition module 202 is configured to partition the portion of data or the entire data into 60 graphics frames, 120 graphics frames, 240 graphics frames, 300 graphics frames, 360 graphics frames, and 480 graphics frames in coordination with and/or in response to the portion of data or the entire data being displayed at a frame rate of 60 FPS (60 Hz), 120 FPS (120 Hz), 240 FPS (240 Hz), 300 FPS (300 Hz), 360 FPS (360 Hz), and 480 FPS (480 Hz), respectively, among other quantities of graphics frames, frame rates, and/or frequency rates that are possible and contemplated herein.

In additional or alternative embodiments, the partition module 202 is configured to partition the portion of data or the entire data to be displayed on the display device 104 into a quantity of graphics frames that is less than the quantity of graphics frames included in one and/or each display cycle of the frame rate and/or frequency rate. Here, while the quantity of graphics frames that is less than the quantity of graphics frames included in one and/or each display cycle of the frame rate and/or frequency rate, the accumulation of the quantity of graphics frames still produces all portions (sub-portions) of the portion of data or all of the entirety of the data.

Thus, in some embodiments, the partition module 202 is configured to partition the portion of data or the entire data into a quantity of graphics frames equal to the quantity of graphics frames included in one and/or each display cycle of a display device 104. In other embodiments, the partition module 202 is configured to partition the portion of data or the entire data into a quantity of graphics frames less than the quantity of graphics frames included in one and/or each display cycle of a display device 104.

In further embodiments, the partition module 202 is configured to partition the portion of data or the entire data twice (e.g., two times (2×)) to generate two different pluralities of graphics frames. Here, a first plurality of graphics frames includes a first quantity of graphics frames equal to the quantity of graphics frames included in one and/or each display cycle of a display device 104 and a second plurality of graphics frames includes a second quantity of graphics frames less than the quantity of graphics frames included in one and/or each display cycle of a display device 104.

The partition module 202, in some embodiments, is configured to transmit a plurality of graphics frames (e.g., the first plurality of graphics frames) for the portion of data and/or the entire data for display on a display device 104 to the graphics frames buffer 112A. In other embodiments, the partition module 202 is configured to transmit another or different plurality of graphics frames (e.g., the second plurality of graphics frames) for the portion of data and/or the entire data for display on a display device 104 to the graphics frames buffer 112B. The partition module 202, in certain embodiments, is configured to transmit both the first plurality of graphics frames and the second plurality of graphics frames) for the portion of data and/or the entire data for display on a display device 104 to the graphics frames buffer 112A and the graphics frames buffer 112B, respectively.

An obfuscate module 204, in some embodiments, may include any suitable hardware and/or software that can facilitate preventing or substantially preventing snipping of the portion of data or the entire data for display on a display device 104. In additional or alternative embodiments, the obfuscate module 204 may include any suitable hardware and/or software that can provide security to data displayed on a display device 104 and/or prevent/substantially prevent shoulder surfing.

In various embodiments, the obfuscate module 204 is configured to arrange an order and/or timing for the display of each graphics frame in the first plurality of graphics frames for display on a display device 104 and command the display module 206 to facilitate displaying each graphics frame in the first plurality of graphics frames in the arranged order and/or timing on the display device 104. In some embodiments, the obfuscate module 204 is configured to arrange the order and/or the timing for the display of each graphics frame in the first plurality of graphics frames on the display device 104 in a predetermined order and/or timing and command the display module 206 to facilitate displaying each graphics frame in the first plurality of graphics frames in the predetermined order and/or timing on the display device 104. The predetermined order and/or timing may be any suitable order and/or timing that allows and/or enables display on the display device 104 of all of the graphics frames in the first plurality of graphics frames in a single display cycle and/or each display cycle of the display device 104.

In certain embodiments, the predetermined order and/or timing is a natural order and/or timing. For example (see, e.g., FIG. 4A), the order and/or timing may begin with graphics frame F0 and end with graphics frame F29 in chronological order. In another non-limiting example, the order and/or timing may begin with graphics frame F29 and end with graphics frame F0 in reverse chronological order. Other natural orders are possible and contemplated herein.

In other embodiments, the predetermined order and/or timing is a preset random order that is repeated in each display cycle for the display device 104. In other words, the preset order and/or timing can include a non-natural order that is repeated each display cycle of the display device 104. Here, the preset random order may be any suitable random order that includes each graphics frame of the first plurality of graphics frames being displayed at least once during each of one or more display cycles of the display device 104.

In further embodiments, the obfuscate module 204 is configured to arrange the order and/or the timing for the display of each graphics frame in the plurality of graphics frames on the display device 104 in a random order and/or timing that changes for each display cycle for the display device 104 and command the display module 206 to facilitate displaying each graphics frame in the first plurality of graphics frames in the random order and/or timing on the display device 104. That is, the obfuscate module 204 is configured to randomize the order and/or the timing of the first plurality of graphics frames at least once every display cycle and/or every second. The order and/or timing can be made random in any suitable manner that includes each graphics frame of the first plurality of graphics frames being displayed at least once during the display cycle for the display device 104. In certain embodiments, no two consecutive display cycles include the same random order and/or timing for the first plurality of graphics frames.

In additional or alternative embodiments, the obfuscate module 204 is configured to insert for display a set of blank, dark, and/or black graphics frames into the second plurality of graphics frames and command the display module 206 to facilitate displaying the combined second plurality of graphics frames and the set of black graphics frames on a display device 104. Insertion of the set of black, dark, and/or blank graphics frames (hereinafter, black graphics frames) into the second plurality of graphics frames allows and/or enables the data displayed on a display device 104 to be obfuscated, blacked out, grayed out, and/or fuzzed out or otherwise made unreadable/detectable by an unauthorized third party (e.g., a shoulder surfer).

The obfuscate module 204 can insert any suitable quantity of black graphics frames into the second plurality of graphics frames that makes the data displayed on a display device 104 unreadable/detectable. Further, each black graphics frame in the set of graphics frames can be inserted and/or combined in any order and/or timing in the second plurality of graphics frames that makes the data displayed on a display device 104 unreadable/detectable.

In some embodiments, in combining the second plurality of graphics frames and the set of black graphics frames, each black graphics frame in the set of graphics frames is inserted in a predetermined and/or preset order and/or timing in the second plurality of graphics frames. In other embodiments, in combining the second plurality of graphics frames and the set of black graphics frames, each black graphics frame in the set of graphics frames is inserted in a random order and/or timing in the second plurality of graphics frames that can change at regular intervals or at the beginning of each new display cycle for the display device 104.

Thus, the obfuscate module 204, in some embodiments, is configured to transmit commands to the display module 206 to facilitate displaying the first plurality of graphics frames for the portion of data or the entire data for display on a first display device 104. In other embodiments, the obfuscate module 204 is configured to transmit commands to the display module 206 to facilitate displaying the combined second plurality of graphics frames and the set of black graphics frames for the portion of data or the entire data for display on a second display device 104. The obfuscate module 204, in certain embodiments, is configured to transmit first commands to the display module 206 to facilitate displaying the first plurality of graphics frames for the portion of data or the entire data for display on a first display device 104 and second commands to facilitate displaying the combined second plurality of graphics frames and the set of black graphics frames for the portion of data or the entire data for display on a second display device 104.

A display module 206 may include any suitable hardware and/or software that can facilitate displaying the first plurality of graphics frames for the portion of data or the entire data for display on a first display device 104 with the order and/or timing provided by the obfuscate module 204. In additional or alternative embodiments, the display module 206 may include any suitable hardware and/or software that can facilitate displaying the combined second plurality of graphics frames and set of black graphics frames for data for display on a second display device 104 with the order and/or timing provided by the obfuscate module 204. In further additional or alternative embodiments, the display module 206 may include any suitable hardware and/or software that can facilitate displaying the second plurality of graphics frames (without the set of black graphics frames) on a display device 104 different than the second display device 104.

A machine learning module 208 may include any suitable hardware and/or software that can utilize a machine learning algorithm to identify and/or determine important data, proprietary data, confidential data, and/or sensitive data, etc. In various embodiments, the machine learning module 208 is configured to identify and/or determine one or more portions of data being displayed and/or that are schedule for display on a display device 104 are important data, proprietary data, confidential data, and/or sensitive data, etc.

The machine learning module 208 may utilize any suitable machine learning algorithm and/or technique that can facilitate identifying and/or determining the one or more portions of important data, proprietary data, confidential data, and/or sensitive data, etc. In some embodiments, the machine learning module 208 utilizes a neural network algorithm to identify and/or determine the one or more portions of important data, proprietary data, confidential data, and/or sensitive data, etc. being displayed and/or that are scheduled for display on the display device 104.

The machine learning module 208 is further configured to transmit the one or more portions of important data, proprietary data, confidential data, and/or sensitive data, etc. being displayed and/or that are scheduled for display on the display device 104 to the partition module 202. In response to receiving the identified and/or determined portion(s) of important data, proprietary data, confidential data, and/or sensitive data, etc., the partition module 202 is configured to partition the portion(s) into a corresponding first plurality of graphics frames, as discussed elsewhere herein.

A graphics frame buffer 112A may include any suitable hardware and/or software that is capable of storing the first plurality of graphics frames for the portion of data and/or the entire data for display on a display device 104. In various embodiments, the graphics frame buffer 112A is configured to store and/or capable of storing any suitable quantity of graphics frames for the portion of data and/or the entire data for display on a display device 104.

With reference to FIGS. 4A through 4C, various non-limiting embodiments of a graphics frame buffer 112A are shown. In FIG. 4A, a graphics frame buffer 112A1 is illustrated in which the graphics frame buffer 112A1 is configured to store and/or capable of storing at least 30 different graphics frames (e.g., graphics frames F0 through F29) for the portion of data or the entire data. In FIG. 4B, a graphics frame buffer 112A2 is illustrated in which the graphics frame buffer 112A2 is configured to store and/or capable of storing at least 60 graphics frames (e.g., graphics frames F0 through F59) for the portion of data or the entire data. In FIG. 4C, a graphics frame buffer 112A3 is illustrated in which the graphics frame buffer 112A3 is configured to store and/or capable of storing a quantity n of graphics frames (e.g., graphics frames F0 through Fn) for the portion of data or the entire data, which quantity n is any suitable quantity of graphics frames for the portion of data or the entire data, as discussed elsewhere herein.

Figure 2B:
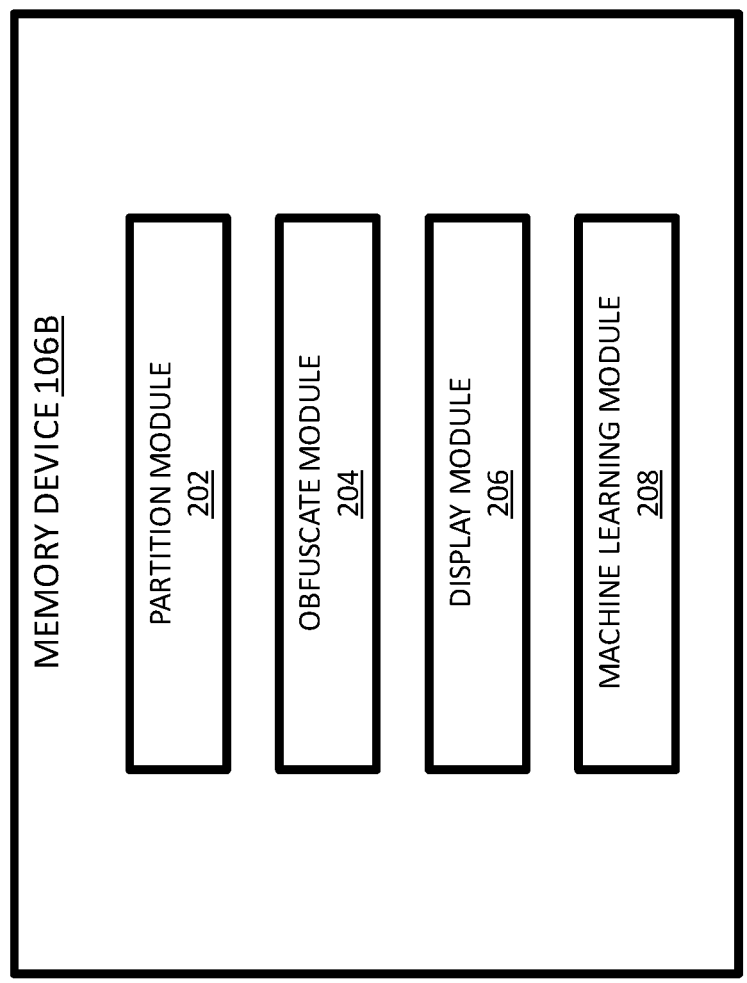

Referring to FIG. 2B, FIG. 2B is a schematic block diagram of another embodiment of a memory device 106B. At least in the illustrated embodiment, the memory device 106B includes, among other components, a partition module 202, an obfuscate module 204, and a display module 206 similar to the partition module 202, the obfuscate module 204, the display module 206, and the machine learning module 208 of the memory device 106A discussed with reference to FIG. 2A.

Figure 2C:
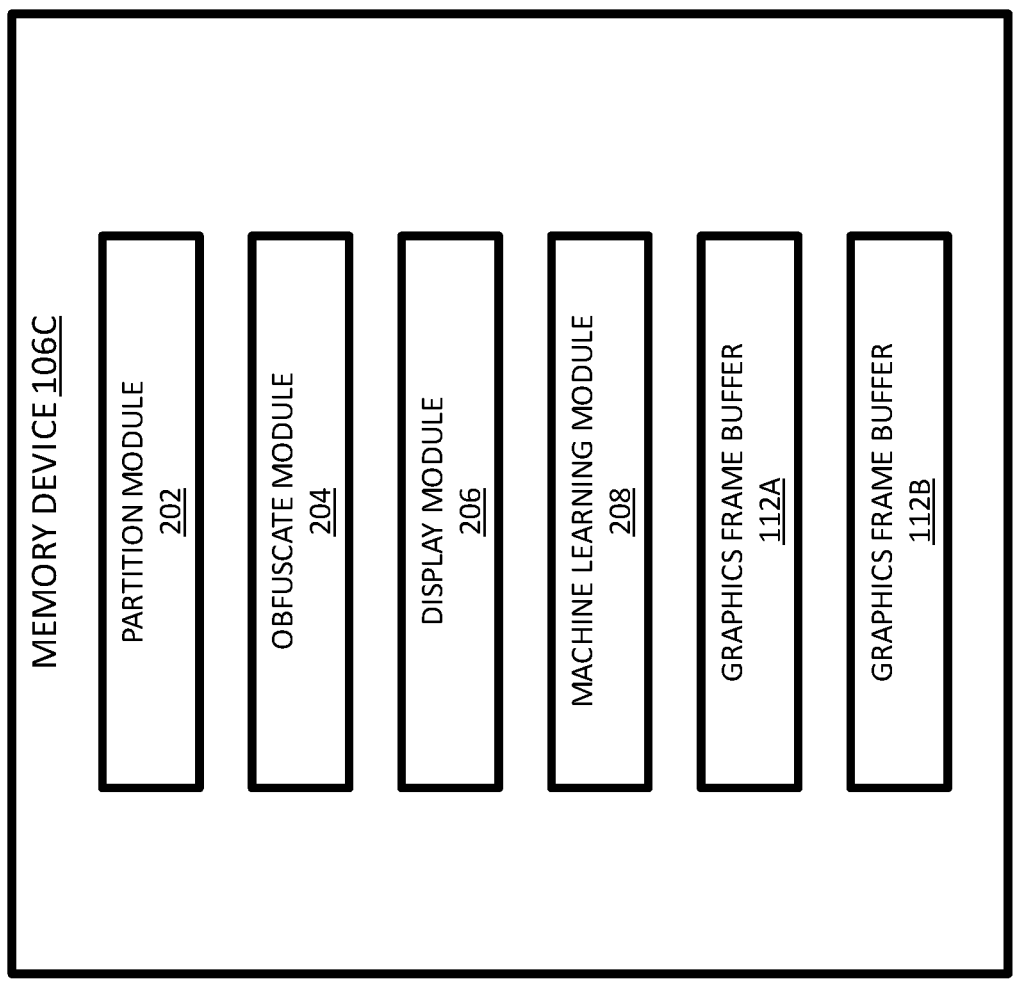

With reference to FIG. 2C, FIG. 2C is a schematic block diagram of yet another embodiment of a memory device 106C. The memory device 106C includes, among other components, a partition module 202, an obfuscate module 204, a display module 206, a machine learning module 208, and a graphics frame buffer 112A similar to the partition module 202, the obfuscate module 204, the display module 206, the machine learning module 208, and the graphics frame buffer 112A of the memory device 106A discussed with reference to FIG. 2A. At least in the illustrated embodiment, the memory device 106C further includes a graphics frame buffer 112B.

A graphics frame buffer 112B may include any suitable hardware and/or software that is capable of storing the combined second plurality of graphics frames and the set of black graphics frames for display on a display device 104. In various embodiments, the graphics frame buffer 112B is configured to store and/or capable of storing any suitable quantity of graphics frames for the data and/or black graphics frames for display on the display device 104.

Figure 5A:
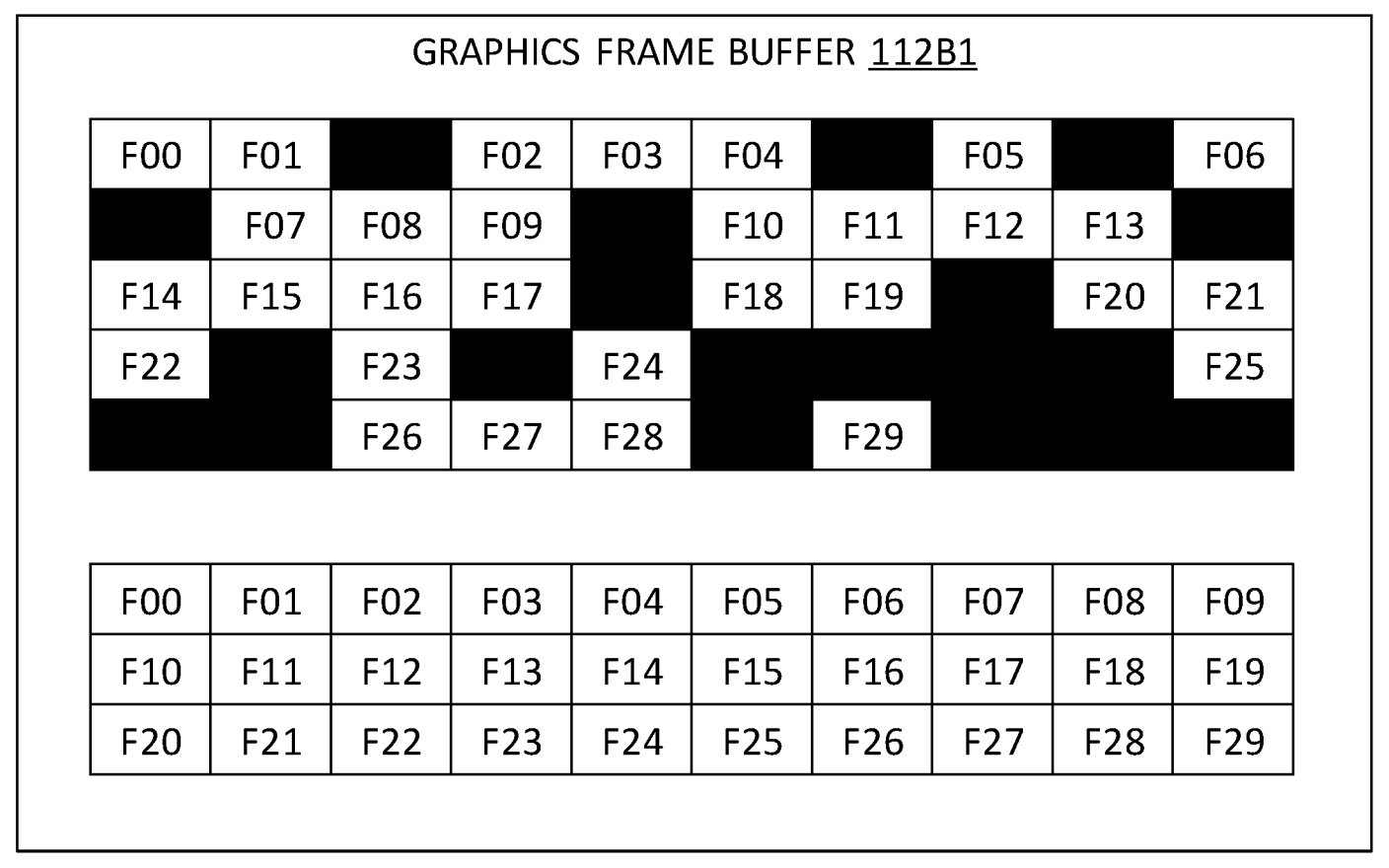
Figure 5B:
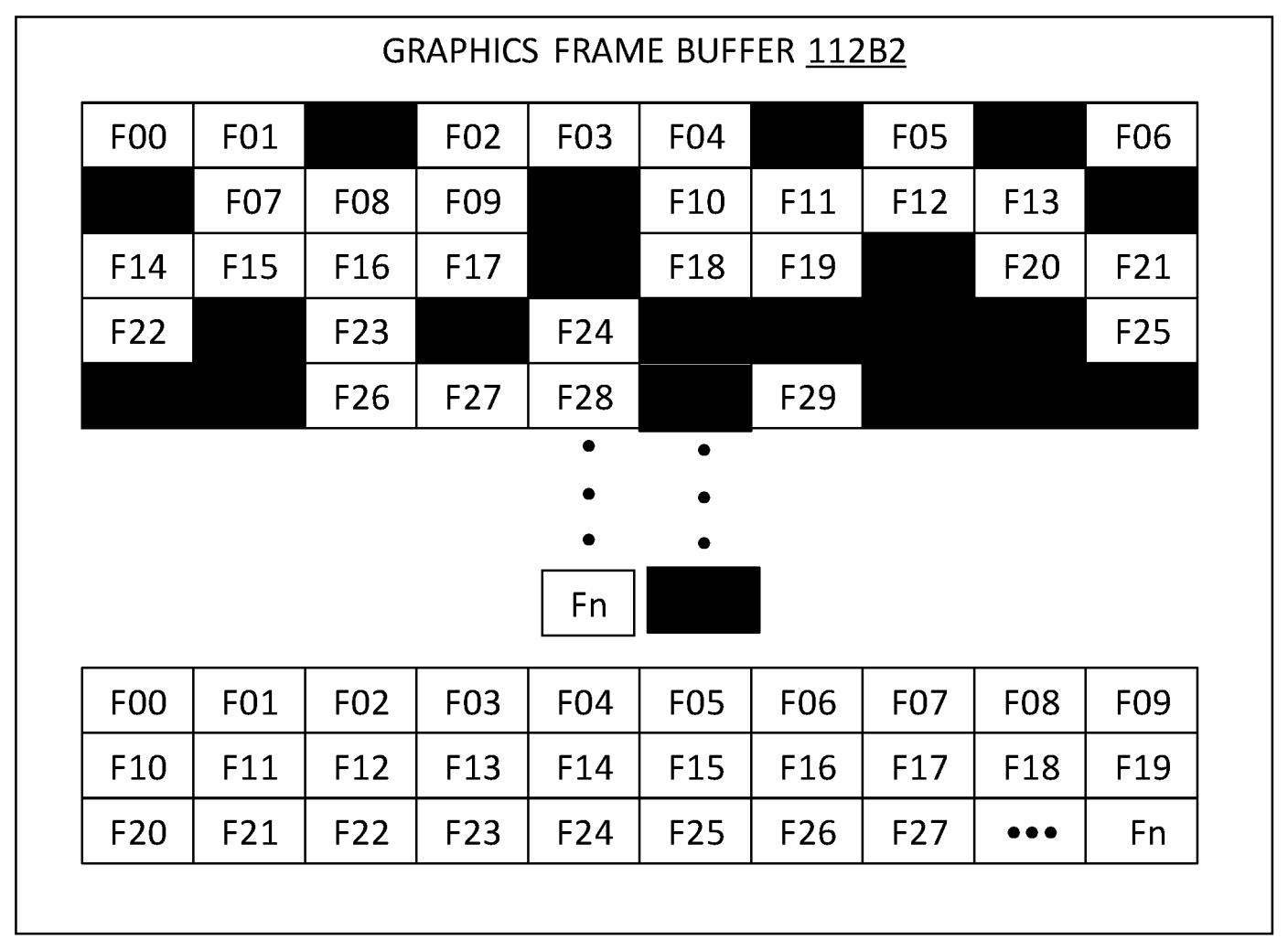

With reference to FIGS. 5A and 5B, various non-limiting embodiments of a graphics frame buffer 112B are shown. In FIG. 5A, a graphics frame buffer 112B1 is illustrated in which the graphics frame buffer 112B1 is configured to store and/or capable of storing at least 30 different graphics frames (e.g., graphics frames F00 through F29) for the data and the 30 different graphics frames combined with a set of twenty (20) black graphics frames, among other quantities of graphics frames and/or black graphics frames that are possible and contemplated herein. In FIG. 5B, a graphics frame buffer 112B2 is illustrated in which the graphics frame buffer 112B2 is configured to store and/or capable of storing a any suitable quantity of graphics frames for the data and the graphics frames combined with any suitable quantity of black graphics frames.

Referring back to FIGS. 1A through 1H, a processor 108 may include any suitable non-volatile/persistent hardware and/or software configured to perform and/or facilitate performing functions and/or operations for preventing data snipping and/or securely displaying data. In various embodiments, the processor 108 includes hardware and/or software for executing instructions in one or more modules and/or applications that can perform and/or facilitate performing functions and/or operations for preventing data snipping and/or securely displaying data. The modules and/or applications executed by the processor 108 for preventing data snipping and/or securely displaying data can be stored on and executed from a memory device 106 and/or from the processor 108.

Figure 3A:
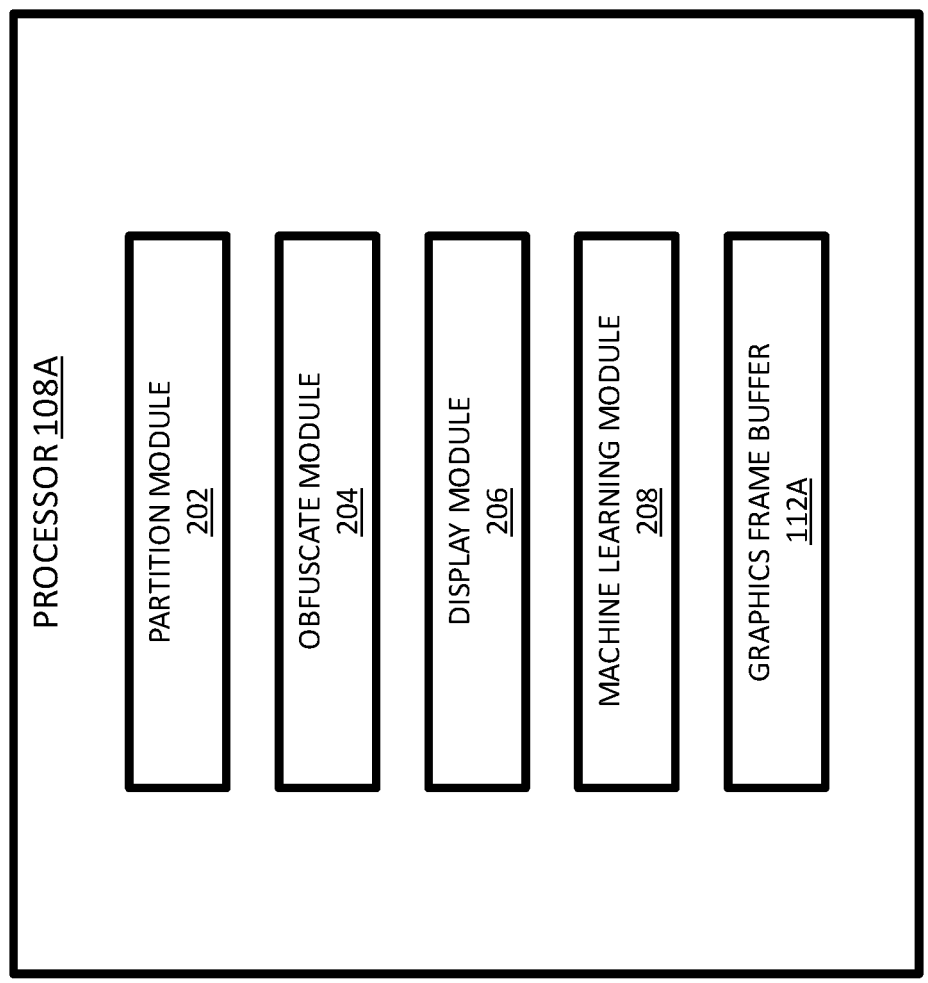

With reference to FIG. 3A, FIG. 3A is a schematic block diagram of one embodiment of a processor 108A. At least in the illustrated embodiment, the processor 108A includes, among other components, a partition module 202, an obfuscate module 204, a display module 206, a machine learning module 208, and a graphics frame buffer 112A similar to the various embodiments of the partition module 202, the obfuscate module 204, the display module 206, the machine learning module 208, and the graphics frame buffer 112A discussed elsewhere herein.

Figure 3B:
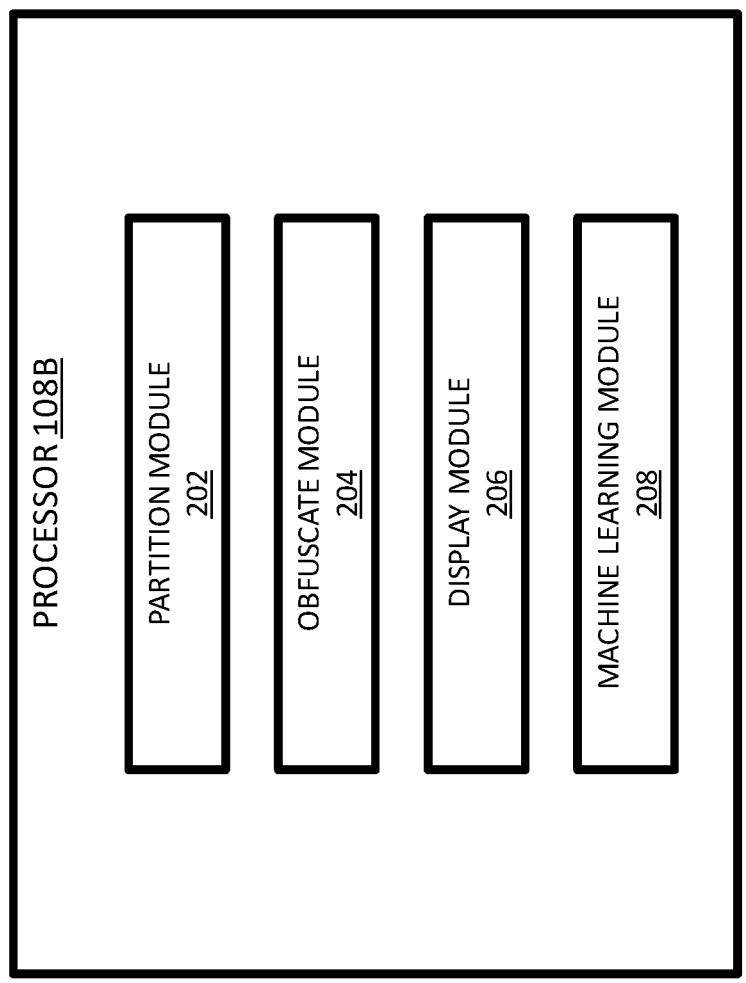

Referring to FIG. 3B, FIG. 3B is a schematic block diagram of another embodiment of a processor 108B. At least in the illustrated embodiment, the processor 108B includes, among other components, a partition module 202, an obfuscate module 204, a display module 206, and a machine learning module 208 similar to the various embodiments of the partition module 202, the obfuscate module 204, the display module 206, and the machine learning module 208 discussed elsewhere herein.

With reference to FIG. 3C, FIG. 3C is a schematic block diagram of yet another embodiment of a processor 108C. At least in the illustrated embodiment, the processor 108C includes, among other components, a partition module 202, an obfuscate module 204, a display module 206, a machine learning module 208, a graphics frame buffer 112A, and a graphics frame buffer 112B similar to the partition module 202, the obfuscate module 204, the display module 206, the machine learning module 208, the graphics frame buffer 112A, and the graphics frame buffer 112B discussed elsewhere herein.

Figure 6A:
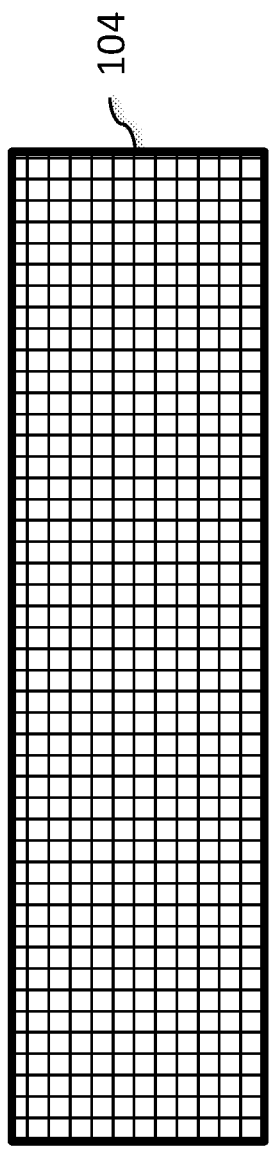
FIGS. 6A and 6B are schematic block diagrams of non-limiting examples of operations performed by the various embodiments of the computing systems (and/or computing networks) of FIGS. 1A through 1H.

Referring to FIG. 6A, FIG. 6A is a schematic diagram illustrating a non-limiting example of the operations of various embodiments of a computing system 100 (e.g., computing systems 1A through 1H). In this example, the entire data on the display device 104 is partitioned into a plurality of graphics frames, as represented by the squares/boxes on the display device 104. Here, each graphics frame of the plurality of graphics frames is displayed one at a time during each display cycle of the display device 104.

A user (e.g., a human), by nature, merges the plurality of graphics frames into a single electronic image provided that the display cycle for the electronic device 104 is greater than approximately 30 FPS or 30 Hz and all of the graphics frames in the plurality of graphics frames are displayed in each display cycle, regardless of the order in which the graphics frames are presented. However, it is a different situation for a computing device attempting to snip, copy, and/or take a screenshot of the electronic image.

Here, because a computing device (e.g., a remote computing device of a remote user) attempting to snip, copy, and/or take a screenshot of the electronic image captures the data displayed on the display device 104 at a particular instance in time, the computing device is only able to capture what is currently being displayed on the display device 104 at that instant. As such, since any particular instance of time during the display cycle of the display device 104 is only actually showing one graphics frame at the time when the snip is performed and/or the screenshot is taken, the snipped data and/or screenshot of the data shown on the display device 104 will only include the particular graphics frame that was actually being displayed at the time the snip was performed and/or the screenshot was taken rather than the entirety of the data (e.g., the electronic image). In this manner, important data, proprietary data, confidential data, and/or sensitive data being displayed on the computing device of a remote user (e.g., a remote computing device) can be kept more secure and/or protected from the being snipped, copied, and/or the subject of a screenshot.

Figure 6B:
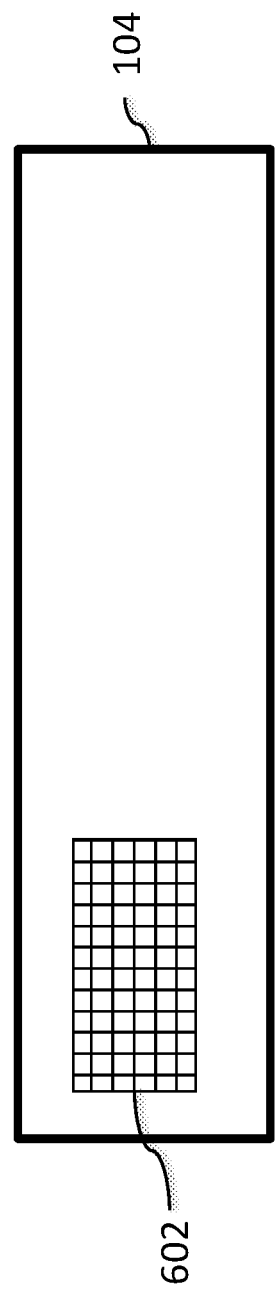

With reference to FIG. 6B, FIG. 6B is a schematic diagram illustrating a non-limiting example of the operations of various embodiments of a computing system 100 (e.g., computing systems 1A through 1H). In this example, a portion 602 of the data on the display device 104 is partitioned into a plurality of graphics frames, as represented by the squares/boxes on the display device 104. Here, each graphics frame of the plurality of graphics frames for the portion 602 is displayed one at a time during each display cycle of the display device 104.

Similar to above, a user will merge the plurality of graphics frames for the portion 602 into a single electronic image. Further, for the same reasons discussed above, a computing device will be unable to snip, copy, and/or take a screenshot of the portion 602. As such, important data, proprietary data, confidential data, and/or sensitive data included in the portion 602 can be kept more secure and/or protected from the being snipped, copied, and/or the subject of a screenshot.

Referring to FIG. 7A, FIG. 7A is a diagram illustrating a non-limiting example of the operations of various embodiments of a computing system 100 (e.g., computing systems 1E and 1F). As illustrated, the data shown on the display device 104C (e.g., an internal display device) is obfuscated or blacked out while the user is viewing the same data on the display device 104D (e.g., an HMD device). The data on the display device 104C is obfuscated or blacked out because a set of black graphics frames has been combined with the plurality of graphics frames (e.g., the second plurality of graphics frames), which results in and/or produces a blacked-out display device 104C or otherwise makes the data displayed thereon unviewable by a human (e.g., an unauthorized third party or shoulder surfer).

With reference to FIG. 7B, FIG. 7B is a diagram illustrating another non-limiting example of the operations of various embodiments of a computing system 100 (e.g., computing systems 1G and 1H). As illustrated, the data shown on the display device 104E (e.g., an external display device or monitor) is obfuscated or blacked out while the user is viewing the same data on the display device 104D (e.g., an HMD device). Here too, the data on the display device 104E is obfuscated or blacked out because a set of black graphics frames has been combined with the plurality of graphics frames (e.g., the second plurality of graphics frames), which results in and/or produces a blacked-out display device 104E or otherwise makes the data displayed thereon unviewable by a human (e.g., an unauthorized third party or shoulder surfer).

Figure 8:
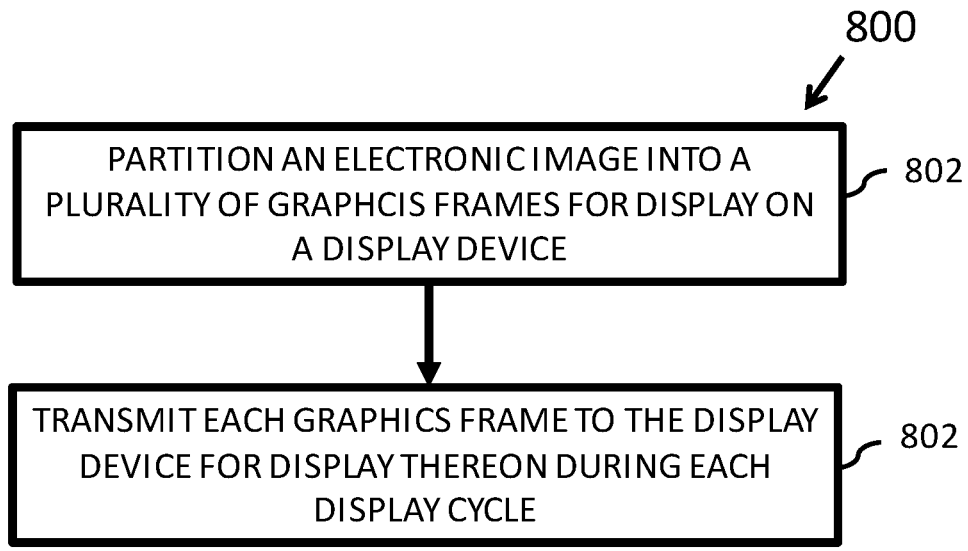
FIG. 8 is a schematic flow chart diagram illustrating one embodiment of a method for preventing data snipping.

FIG. 8 is a schematic flow chart diagram illustrating one embodiment of a method 800 for preventing data snipping. At least in the illustrated embodiment, the method 800 begins by a processor 108 partitioning an electronic image into a plurality of graphics frames for display on a display device 104 (block 802). In some embodiments, each separate graphics frame in the plurality of graphics frames includes a different portion of the electronic image.

The processor 108 transmits each separate graphics frame of the plurality of graphics frames to the display device 104 for display thereon (block 804). The graphics frames may be transmitted to the display device 104 in any suitable order and/or timing, as discussed elsewhere herein.

In certain embodiments, each separate graphics frame in the plurality of graphics frames is separately transmitted to the display device 104 for display thereon within each display cycle of the display device 104. In some embodiments, each separate graphics frame in the plurality of graphics frames only includes its respective different portion of the electronic image.

In various embodiments, a frame rate of the display cycle is at least 30 frames per second (FPS), among other frame rates that are possible and contemplated herein, as discussed elsewhere herein. Further, the plurality of graphics frames comprises at least 30 graphics frames among other quantities that are possible and contemplated herein, as discussed elsewhere herein. In various embodiments, transmitting each separate graphics frame of the plurality of graphics frames to the display device 104 includes transmitting each of the graphics frames to the display device 104 for display thereon during each display cycle. In this manner, the electronic image is prevented from being snipped by a remote computing device.

Figure 9:
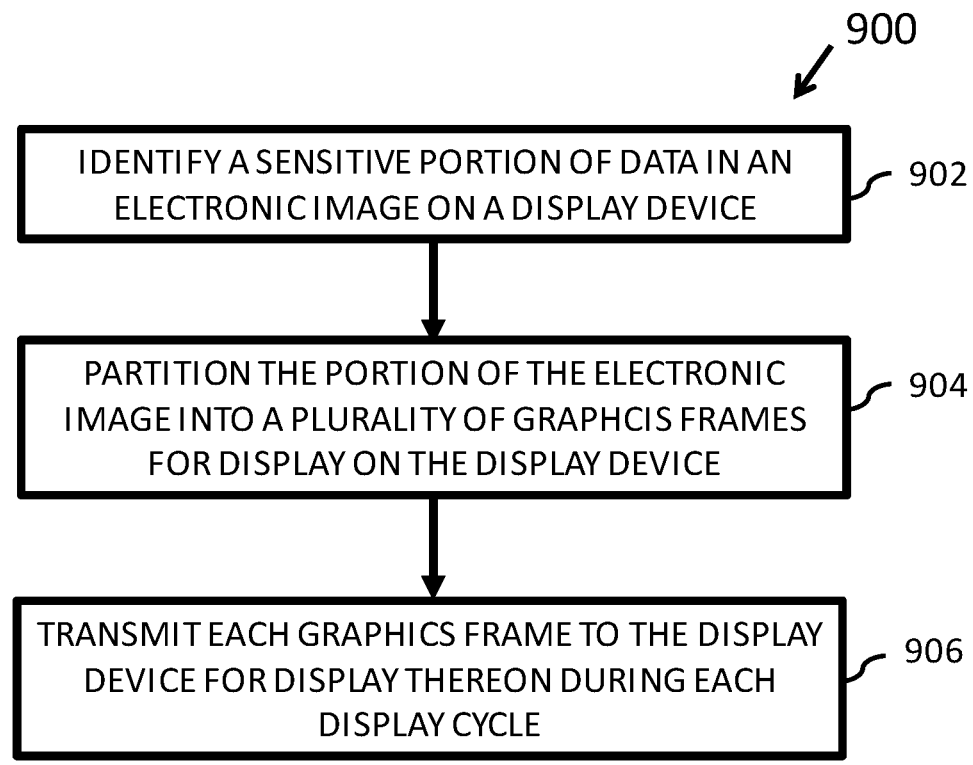
FIG. 9 is a schematic flow chart diagram illustrating another embodiment of a method for preventing data snipping.

FIG. 9 is a schematic flow chart diagram illustrating another embodiment of a method 900 for preventing data snipping. At least in the illustrated embodiment, the method 900 begins by a processor 108 identifying (e.g., independently and/or automatically) an area or portion within a larger electronic image that includes sensitive data (block 902).

The processor 108 partitions the portion of the electronic image into a plurality of graphics frames for display on a display device 104 (block 904). In some embodiments, each separate graphics frame in the plurality of graphics frames includes a different portion of the portion of the electronic image.

The processor 108 transmits each separate graphics frame of the plurality of graphics frames to the display device 104 for display thereon (block 906). The graphics frames may be transmitted to the display device 104 in any suitable order and/or timing, as discussed elsewhere herein.

In certain embodiments, each separate graphics frame in the plurality of graphics frames is separately transmitted to the display device 104 for display thereon within each display cycle of the display device 104. In some embodiments, each separate graphics frame in the plurality of graphics frames only includes its respective different portion of the electronic image.

In various embodiments, a frame rate of the display cycle is at least 30 frames per second (FPS), among other frame rates that are possible and contemplated herein, as discussed elsewhere herein. Further, the plurality of graphics frames comprises at least 30 graphics frames among other quantities that are possible and contemplated herein, as discussed elsewhere herein. In various embodiments, transmitting each separate graphics frame of the plurality of graphics frames to the display device 104 includes transmitting each of the graphics frames to the display device 104 for display thereon during each display cycle. In this manner, the portion of the electronic image is prevented from being snipped by a remote computing device.

Figure 10:
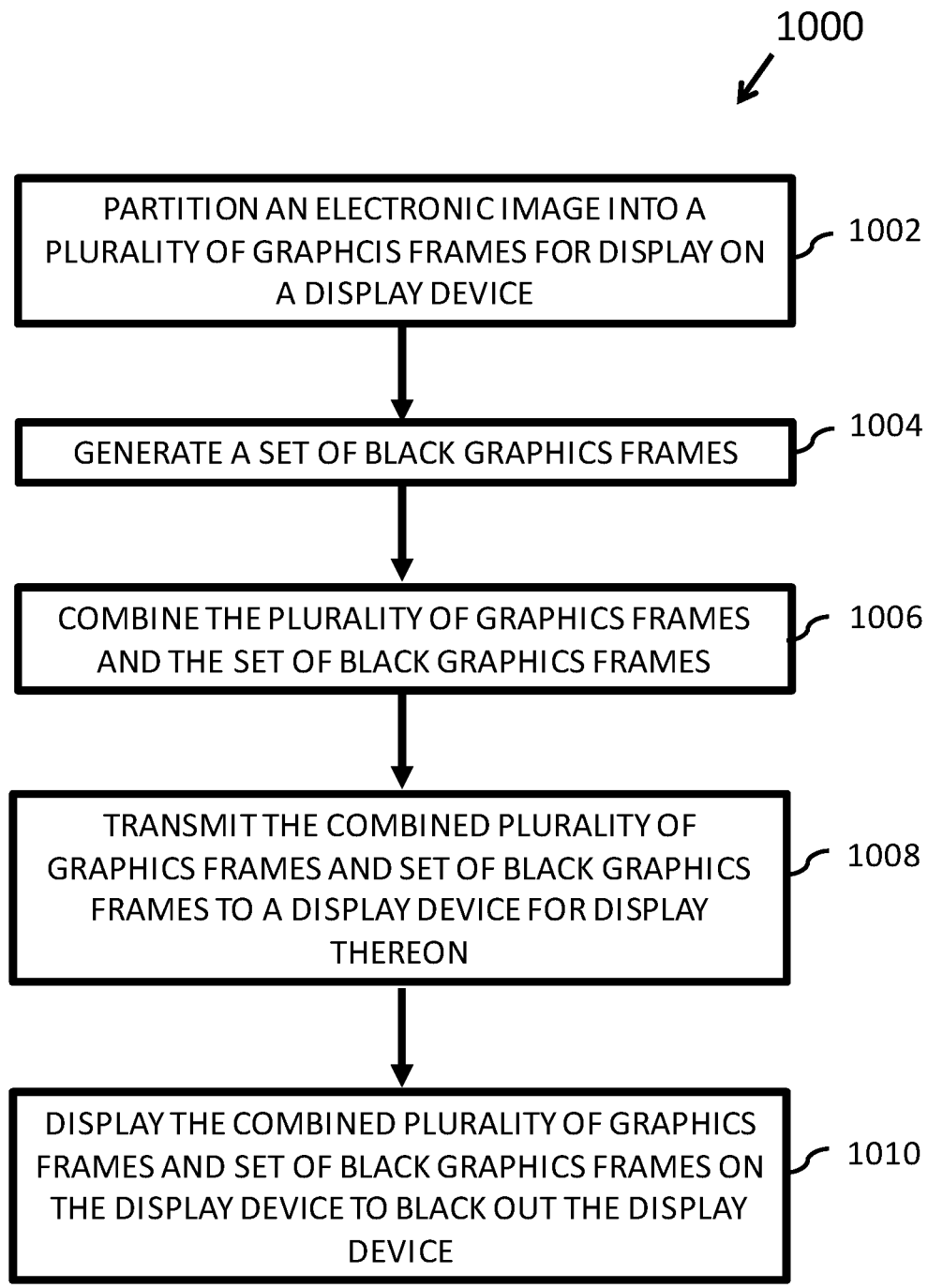
FIG. 10 is a schematic flow chart diagram illustrating one embodiment of a method for preventing an unauthorized third party from viewing data on a display device.

FIG. 10 is a schematic flow chart diagram illustrating one embodiment of a method 1000 for preventing an unauthorized third party from viewing data on a display device 104. At least in the illustrated embodiment, the method 1000 begins by a processor 108 partitioning an electronic image into a plurality of graphics frames (e.g., the second plurality of graphics frames) for display on a display device 104 (block 1002).

The processor 108 generates a set of black graphics frames (block 1004) and combines the plurality of graphics frames and the set of black graphics frames (block 1006). The plurality of graphics frames and the set of black graphics frames may include any suitable quantity of graphics frames and/or black graphics frames, as discussed elsewhere herein.

The processor 108 transmits the combined plurality of graphics frames and set of black graphics frames to a display device 104 for display thereon (block 1008). The processor 108 facilitates the display of and the display device 104 displays the combined plurality of graphics frames and set of black graphics frames to black out the display device 104. In this manner, an unauthorized third party is unable to view the data on the display device and/or shoulder surf.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor of an information handling device; and
a memory configured to store code executable by the processor to:
partition an electronic image into a plurality of graphics frames for display on a display device in each display cycle of a plurality of display cycles, wherein:
each separate graphics frame in the plurality of graphics frames includes data for a different portion of the electronic image, and
each separate graphics frame includes all of the data corresponding to its different portion of the electronic image, and
transmit each separate graphics frame of the plurality of graphics frames to the display device in each display cycle of the plurality of display cycles, wherein:
each separate graphics frame in the plurality of graphics frames is separately transmitted to the display device, and
each separate graphics frame is separately displayed on the display device at different times during each display cycle of the plurality of display cycles.

2. The apparatus of claim 1, wherein:
each separate graphics frame in the plurality of graphics frames only includes the data corresponding to its respective different portion of the electronic image; and
displaying each separate graphics frame on the display device at different times during each display cycle of the plurality of display cycles comprises displaying each separate graphics frame one graphics frame at a time on the display device during each display cycle.

3. The apparatus of claim 1, wherein:
a frame rate of the display cycle is at least 30 frames per second (FPS);
the plurality of graphics frames comprises at least 30 graphics frames; and
each of the at least 30 graphics frames are transmitted to the display device for display thereon during each display cycle of the at least 30 FPS frame rate.

4. The apparatus of claim 1, wherein the electronic image forms a portion of a larger electronic image.

5. The apparatus of claim 4, wherein the code executable further causes the processor to independently and automatically identify an area in the larger electronic image that includes the portion of the electronic image.

6. The apparatus of claim 5, wherein the area in the larger electronic image is independently and automatically identified via a machine learning algorithm.

7. The apparatus of claim 1, wherein each separate graphics frame of the plurality of graphics frames is transmitted to the display device in different random orders during each display cycle.

8. A method, comprising:
partitioning, by a processor, an electronic image into a plurality of graphics frames for display on a display device in each display cycle of a plurality of display cycles, wherein:
each separate graphics frame in the plurality of graphics frames includes data for a different portion of the electronic image, and
each separate graphics frame includes all of the data corresponding to its different portion of the electronic image; and
transmitting each separate graphics frame of the plurality of graphics frames to the display device in each display cycle of the plurality of display cycles,
wherein:
each separate graphics frame in the plurality of graphics frames is separately transmitted to the display device, and
each separate graphics frame is separately displayed on the display device at different times during each display cycle of the plurality of display cycles.

9. The method of claim 8, wherein:
each separate graphics frame in the plurality of graphics frames only includes the data corresponding its respective different portion of the electronic image; and
displaying each separate graphics frame on the display device at different times during each display cycle of the plurality of display cycles comprises displaying each separate graphics frame one graphics frame at a time on the display device during each display cycle.

10. The method of claim 8, wherein:
a frame rate of the display cycle is at least 30 frames per second (FPS);
the plurality of graphics frames comprises at least 30 graphics frames; and
transmitting each separate graphics frame of the plurality of graphics frames to the display device comprises transmitting each of the at least 30 graphics frames to the display device for display thereon during each display cycle of the at least 30 FPS frame rate.

11. The method of claim 8, wherein the electronic image forms a portion of a larger electronic image.

12. The method of claim 11, further comprising:
independently and automatically identifying an area in the larger electronic image that includes the portion of the electronic image.

13. The method of claim 12, wherein independently and automatically identifying the area in the larger electronic image comprises utilizing a machine learning algorithm to independently and automatically identify the area in the larger electronic image.

14. The apparatus of claim 8, wherein transmitting each separate graphics frame of the plurality of graphics frames to the display device comprises transmitting each separate graphics frame of the plurality of graphics frames to the display device in different random orders during each display cycle.

15. A computer program product comprising a computer-readable storage medium configured to store code executable by a processor, the executable code comprising code to perform:
partitioning an electronic image into a plurality of graphics frames for display on a display device in each display cycle of a plurality of display cycles, wherein:
each separate graphics frame in the plurality of graphics frames includes data for a different portion of the electronic image, and
each separate graphics frame includes all of the data corresponding to its different portion of the electronic image; and transmitting each separate graphics frame of the plurality of graphics frames to the display device in each display cycle of the plurality of display cycles, wherein:
- each separate graphics frame in the plurality of graphics frames is separately transmitted to the display device, and
- each separate graphics frame is separately displayed on the display device at different times during each display cycle of the plurality of display cycles.

16. The computer program product of claim 15, wherein:
each separate graphics frame in the plurality of graphics frames only includes the data corresponding to its respective different portion of the electronic image; and
displaying each separate graphics frame on the display device at different times during each display cycle of the plurality of display cycles comprises displaying each separate graphics frame one graphics frame at a time on the display device during each display cycle.

17. The computer program product of claim 15, wherein:
a frame rate of the display cycle is at least 30 frames per second (FPS);
the plurality of graphics frames comprises at least 30 graphics frames; and
transmitting each separate graphics frame of the plurality of graphics frames to the display device comprises transmitting each of the at least 30 graphics frames to the display device for display thereon during each display cycle of the at least 30 FPS frame rate.

18. The computer program product of claim 15, wherein:
the electronic image forms a portion of a larger electronic image; and
the executable code further comprises code that causes the processor to independently and automatically identifying an area in the larger electronic image that includes the portion of the electronic image.

19. The computer program product of claim 18, wherein the code that causes the processor to independently and automatically identifying the area in the larger electronic image comprises a machine learning algorithm that causes the processor to independently and automatically identify the area in the larger electronic image.

20. The computer program product of claim 15, wherein the executable code for transmitting each separate graphics frame of the plurality of graphics frames to the display device comprises code for transmitting each separate graphics frame of the plurality of graphics frames to the display device in different random orders during each display cycle.

* * * * *